United States Patent
Nakayama et al.

(10) Patent No.: US 11,407,868 B2
(45) Date of Patent: Aug. 9, 2022

(54) METHOD FOR PRODUCING AQUEOUS POLYIMIDE PRECURSOR SOLUTION COMPOSITION

(71) Applicant: UBE INDUSTRIES, LTD., Ube (JP)

(72) Inventors: Takeshige Nakayama, Ube (JP); Susumu Takasaki, Ube (JP); Tomonori Nakayama, Ube (JP); Kensuke Hiroshige, Ube (JP)

(73) Assignee: Ube Industries, Ltd., Ube (JP)

( * ) Notice: Subject to any disclaimer, the term of this patent is extended or adjusted under 35 U.S.C. 154(b) by 1 day.

(21) Appl. No.: 16/832,337

(22) Filed: Mar. 27, 2020

(65) Prior Publication Data

US 2020/0247969 A1    Aug. 6, 2020

Related U.S. Application Data

(62) Division of application No. 14/371,838, filed as application No. PCT/JP2013/050324 on Jan. 10, 2013, now abandoned.

(30) Foreign Application Priority Data

Jan. 13, 2012 (JP) .................. 2012-005694

(51) Int. Cl.
| | |
|---|---|
| *C08J 5/18* | (2006.01) |
| *C08L 79/08* | (2006.01) |
| *C08K 5/3445* | (2006.01) |
| *B29C 39/00* | (2006.01) |
| *B29C 39/38* | (2006.01) |
| *C08G 73/10* | (2006.01) |
| *B29K 79/00* | (2006.01) |
| *B29K 105/00* | (2006.01) |
| *B29L 31/34* | (2006.01) |

(52) U.S. Cl.
CPC .............. *C08J 5/18* (2013.01); *B29C 39/006* (2013.01); *B29C 39/38* (2013.01); *C08G 73/10* (2013.01); *C08K 5/3445* (2013.01); *C08L 79/08* (2013.01); *B29K 2079/08* (2013.01); *B29K 2105/0002* (2013.01); *B29K 2105/0073* (2013.01); *B29L 2031/3475* (2013.01); *C08J 2379/08* (2013.01); *Y10T 428/31721* (2015.04)

(58) Field of Classification Search
None
See application file for complete search history.

(56) References Cited

U.S. PATENT DOCUMENTS

| | | | | |
|---|---|---|---|---|
| 3,440,197 A | * | 4/1969 | Boldebuck | C08G 73/00 524/714 |
| 3,507,765 A | * | 4/1970 | Holub | C08G 73/1071 204/492 |
| 3,575,923 A | * | 4/1971 | Jones | C08G 73/1028 528/229 |
| 3,703,493 A | | 11/1972 | Holub | |
| 4,221,897 A | * | 9/1980 | Takekoshi | C08G 73/1007 528/125 |
| 4,470,944 A | | 9/1984 | Asakura | |
| 4,480,088 A | | 10/1984 | Pike | |
| 4,908,409 A | | 3/1990 | Oikawa et al. | |
| 2002/0151234 A1 | | 10/2002 | Ozawa et al. | |
| 2004/0266979 A1 | | 12/2004 | Oguro et al. | |
| 2006/0057916 A1 | | 3/2006 | Ozawa et al. | |
| 2010/0187719 A1 | | 7/2010 | Oishi et al. | |
| 2012/0270999 A1 | | 10/2012 | Hasegawa | |
| 2013/0171520 A1 | | 7/2013 | Nakayama et al. | |
| 2014/0218875 A1 | | 8/2014 | Nakayama et al. | |
| 2014/0363687 A1 | * | 12/2014 | Nakayama | C08G 73/10 428/473.5 |

FOREIGN PATENT DOCUMENTS

| | | | |
|---|---|---|---|
| CN | 103930470 A | 7/2014 | |
| EP | 2147766 A1 | 1/2010 | |
| EP | 2594609 A1 | 5/2013 | |
| EP | 2754683 A1 | 7/2014 | |
| GB | 1162203 A | 8/1969 | |
| JP | S63-128025 A | 5/1988 | |
| JP | H08-59832 A | 3/1996 | |
| JP | H10-310639 A | 11/1998 | |
| JP | 2002-161136 A | 6/2002 | |
| JP | 2002-226582 A | 8/2002 | |
| JP | 2002-348374 A | 12/2002 | |
| JP | 2005-015629 A | 1/2005 | |
| JP | 2010-202729 A | 9/2010 | |
| JP | 2012-062344 A | 3/2012 | |
| JP | 2013-018909 A | 1/2013 | |
| WO | WO 2011/030860 A1 | 3/2011 | |
| WO | WO 2011/065131 A1 | 6/2011 | |
| WO | WO 2011/086627 A1 | 7/2011 | |
| WO | WO-2011154132 A1 * | 12/2011 | ......... C08G 73/1042 |

OTHER PUBLICATIONS

Der-Jang Liaw et al. "Color lightness and highly organosoluble fluorinated polyamides, polyimides and poly(amide-imide)s based on noncoplanar 2,2'-dimethyl-4,4'-biphenylene units" Polymer, 47, 2337 (2006).

First Notification of Office Action in Chinese Patent Application No. 201380013723.9, dated Sep. 6, 2015.

International Preliminary Report on Patentability and Written Opinion in corresponding PCT Application No. PCT/JP2013/050324, dated Jul. 24, 2014.

(Continued)

*Primary Examiner* — Rachel Kahn

(74) *Attorney, Agent, or Firm* — Knobbe, Martens, Olson & Bear, LLP

(57) ABSTRACT

A method for producing an aqueous polyimide precursor solution includes forming a polyamic acid by the reaction of a tetracarboxylic acid component and a diamine component in water without organic solvent together with an imidazole in an amount of 1.6 mole or more per mole of the tetracarboxylic acid component of the polyamic acid.

8 Claims, No Drawings

(56) References Cited

OTHER PUBLICATIONS

M. Hasegawa "Semi-Aromatic Polyimides with Low Dielectric Constant and Low CTE" High Perform. Polym. 13, S93-S106 (2001).
Matsuura et al., "Polyimides derived from 2,2'-bis(trifluoromethyl)-4,4'-diaminobiphenyl. 3. Property control for polymer blends and copolymerization of fluorinated polyimides", Macromolecules 1993 26 (3), 419-423) (Year: 1993).
Office Action for Taiwanese Patent Application No. 102101140, dated May 3, 2016.
Supplementary European Search Report in EP Application No. 13735890.9, dated Jul. 28, 2015.

\* cited by examiner

US 11,407,868 B2

METHOD FOR PRODUCING AQUEOUS POLYIMIDE PRECURSOR SOLUTION COMPOSITION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to an aqueous polyimide precursor solution composition and a method for easily producing an aqueous polyimide precursor solution composition. The aqueous polyimide precursor solution composition is preferred because of having high environmental acceptability as compared with a polyimide precursor solution composition comprising an organic solvent. The production method of the present invention does not require any solvent other than water, and therefore it may provide an aqueous polyimide precursor solution composition having a lower content of organic solvent than the conventional compositions, and may provide an aqueous polyimide precursor solution composition containing an aqueous solvent and containing no organic solvent, which has higher environmental acceptability. In addition, a polyimide may be suitably obtained from the aqueous polyimide precursor solution composition. A polyimide obtained from a specific aqueous polyimide precursor solution composition of the present invention, in particular, has excellent properties such as high transparency, flexibility, heat resistance, electrical properties, and solvent resistance.

The present invention also relates to an aqueous polyimide precursor solution composition for a flexible device substrate, for example, an aqueous polyimide precursor solution composition for a substrate of a display device such as a liquid crystal display, an organic EL display and an electronic paper, and a light-receiving device such as a light-receiving element of a thin-film solar battery.

Description of the Related Art

A polyimide obtained from a tetracarboxylic dianhydride and a diamine has excellent properties such as heat resistance, mechanical strength, electrical properties, and solvent resistance, and therefore is widely used in the electrical/electronics industrial field, and the like. Because polyimides have poor solubility in organic solvents, however, polyimides are generally prepared by applying a solution composition in which a polyamic acid as a polyimide precursor is dissolved in an organic solvent, for example, onto a substrate surface, and then heating the solution composition at a high temperature to effect dehydration/ring closure (imidization). The polyamic acid solution composition to produce a polyimide contains an organic solvent and must be subjected to heat treatment at a high temperature, and therefore the polyamic acid solution composition is not necessarily environmentally friendly and in some cases, its application is limited.

Meanwhile, with the coming of an advanced information society, the developments of optical materials such as an optical fiber and an optical waveguide in the field of optical communications, and optical materials such as a liquid crystal oriented film and a protective film for a color-filter in the field of display devices has recently advanced. In the field of display devices, in particular, a plastic substrate which is light-weight and excellent in flexibility has been studied as an alternative to a glass substrate, and the development of a display which is capable of being folded and rolled has been intensively conducted. Accordingly, there is need for a higher-performance optical material which may be used for such purposes.

Generally, polyimides are intrinsically yellowish-brown-colored due to intramolecular conjugation and formation of charge-transfer complexes. As a solution to this problem, a method of developing transparency, for example, by introducing fluorine into the molecule, imparting flexibility to the main chain, introducing a bulky side chain into the molecule, or the like to suppress the formation of charge-transfer complexes is proposed (Non Patent Literature 1). Methods of developing transparency by using semi-alicyclic or wholly-alicyclic polyimide resins which do not form charge-transfer complexes in principle are also proposed (Patent Literature 1, Patent Literature 2, Patent Literature 3, Non Patent Literature 2). Among them, the use of alicyclic tetracarboxylic dianhydride and/or alicyclic diamine as the monomer component, and the introduction of fluorine into the molecule are particularly effective methods for providing transparent polyimide.

As for a water-soluble polyimide precursor, Patent Literature 4, for example, proposes a process for producing an aqueous polyamide acid salt solution composition, comprising polymerizing a tetracarboxylic dianhydride and a diamine in an organic solvent, to provide a polyamide acid;

optionally hydrolyzing the polyamide acid, as necessary;

pouring the resulting varnish into water, to pulverize the polyamide acid and to extract and remove a reaction solvent contained in the polyamide acid;

drying the polyamide acid; and reacting the polyamide acid in water with a certain amine compound such as 2-methylamino diethanol to form a water-soluble polyamide acid salt. However, it is difficult to form a high molecular weight polymer from this aqueous polyamide acid salt solution composition (polyimide precursor composition) and it is also desirable to further improve the properties of the polyimide obtained.

Patent Literature 5 proposes a water-soluble polyimide precursor prepared by reacting a polyamic acid (polyimide precursor), which is prepared by reacting a tetracarboxylic acid component with an aromatic diamine component in an organic solvent, with 1,2-dimethylimidazole and/or 1-methyl-2-ethylimidazole, and then separating the water-soluble polyimide precursor from the reaction mixture. The water-soluble polyimide precursors prepared in Examples of Patent Literature 5, however, were ones from which only amorphous aromatic polyimides could be obtained. Although a polyimide which is obtained from the water-soluble polyimide precursor prepared in Patent Literature 5 is amorphous and thermal-fusion bondable, and is suitably used as a binder for a woven or nonwoven fabric made of organic or inorganic fibers, there is room for improvement in the properties of the polyimide in some applications. Additionally, the aqueous polyimide precursor solution composition is prepared by a process, comprising preparing a water-soluble polyimide precursor in an organic solvent;

separating the water-soluble polyimide precursor therefrom; and dissolving the separated water-soluble polyimide precursor in an aqueous solvent.

Thus, extremely complicated operations are needed. Moreover, an organic solvent cannot be completely removed from a water-soluble polyimide precursor prepared in the organic solvent. (If the water-soluble polyimide precursor is heated so as to completely remove the organic solvent, imidization occurs, and therefore the polyimide precursor loses solubility in water.) For this reason, the aqueous polyimide precursor solution composition obtained will inevitably contain an organic solvent.

In addition, Patent Literature 6 proposes a method for producing a flexible device substrate, using a polyimide precursor resin composition which comprises an organic solvent, specifically, N-methyl-2-pyrrolidone, N,N-dimethylformamide, N,N-dimethylacetamide, or the like as a solvent. In the meantime, from the point of view of environmental acceptability, there is a need for a composition comprising an aqueous solvent, as described above.

CITATION LIST

Patent Literature

Patent Literature 1: JP-A-2002-348374
Patent Literature 2: JP-A-2005-15629
Patent Literature 3: JP-A-2002-161136
Patent Literature 4: JP-A-H08-59832
Patent Literature 5: JP-A-2002-226582
Patent Literature 6: JP-A-2010-202729

Non Patent Literature

Non Patent Literature 1: Polymer, 47, 2337 (2006)
Non Patent Literature 2: M. Hasegawa, High Perform. Polym. 13, S93-S106 (2001)

SUMMARY OF THE INVENTION

Problems to be Solved by the Invention

The first objective of the present invention is to provide an aqueous polyimide precursor solution composition which comprises an aqueous solvent and has good environmental acceptability, and may provide a polyimide having high transparency, and having excellent properties such as flexibility, heat resistance, electrical properties, and solvent resistance, and preferably comprises a solvent containing no organic solvent other than water. Another objective of the present invention is to provide a method for easily producing the aqueous polyimide precursor solution composition without the need for a solvent other than water.

The second objective of the present invention is to provide a polyimide precursor resin composition for flexible device substrates which comprises an aqueous solvent and has good environmental acceptability, and may provide a polyimide substrate for flexible device having high transparency, and having excellent properties such as flexibility, heat resistance, electrical properties, and solvent resistance, and being suitably usable as a substrate for flexible device as a display device such as substrates for a liquid crystal display, an organic EL display and an electronic paper, a substrate for flexible device as a light-receiving device such as a substrate for a thin-film solar battery, and the like, and preferably comprises a solvent containing no organic solvent other than water.

Means for Solving the Problems

The present invention relates to the following items.
[1] An aqueous polyimide precursor solution composition, wherein
a polyamic acid, which is formed by the reaction of a tetracarboxylic acid component and a diamine component, and consists of a repeating unit represented by the following formula (1), is dissolved in an aqueous solvent together with an imidazole in an amount of 1.6 mole or more per mole of the tetracarboxylic acid component of the polyamic acid.

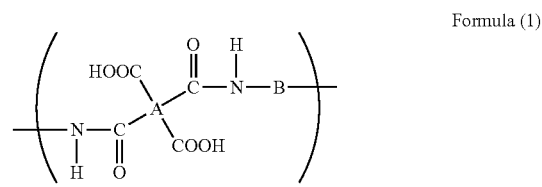

Formula (1)

wherein
A represents at least one selected from the group consisting of a tetravalent group of an aromatic tetracarboxylic acid containing no fluorine group, from which carboxyl groups have been removed, a tetravalent group of an aliphatic tetracarboxylic acid, from which carboxyl groups have been removed, and a tetravalent group of an aromatic tetracarboxylic acid containing a fluorine group, from which carboxyl groups have been removed, and B represents at least one selected from the group consisting of a divalent group of an aromatic diamine containing no fluorine group and having a solubility in water at 25° C. of 0.1 g/L or more, from which amino groups have been removed, a divalent group of an aliphatic diamine having a molecular weight of 500 or less, from which amino groups have been removed, and a divalent group of an aromatic diamine containing a fluorine group, from which amino groups have been removed,
with the proviso that
not less than 50 mol % of A is a tetravalent group of an aliphatic tetracarboxylic acid, from which carboxyl groups have been removed, and/or a tetravalent group of an aromatic tetracarboxylic acid containing a fluorine group, from which carboxyl groups have been removed, and not more than 50 mol %, including 0 mol %, of A is a tetravalent group of an aromatic tetracarboxylic acid containing no fluorine group, from which carboxyl groups have been removed, and/or
not less than 50 mol % of B is a divalent group of an aliphatic diamine having a molecular weight of 500 or less, from which amino groups have been removed, and/or a divalent group of an aromatic diamine containing a fluorine group, from which amino groups have been removed, and not more than 50 mol %, including 0 mol %, of B is a divalent group of an aromatic diamine containing no fluorine group and having a solubility in water at 25° C. of 0.1 g/L or more, from which amino groups have been removed.

[2] The aqueous polyimide precursor solution composition as described in [1], wherein the imidazole is selected from the group consisting of 1,2-dimethylimidazole, 2-ethyl-4-methylimidazole, 4-ethyl-2-methylimidazole, and 1-methyl-4-ethylimidazole.

[3] The aqueous polyimide precursor solution composition as described in any one of [1] to [2], wherein the aqueous polyimide precursor solution composition has an organic solvent content of less than 5 wt %.

[4] The aqueous polyimide precursor solution composition as described in [3], wherein the aqueous polyimide precursor solution composition contains substantially no organic solvent.

[5] A polyimide produced by heating the aqueous polyimide precursor solution composition as described in any one of [1] to [4].

[6] The polyimide as described in [5], wherein the polyimide has a light transmittance at 400 nm of 60% or more when the polyimide is formed into a film having a thickness of 10 μm.

[7] The polyimide as described in [5], wherein the polyimide has a total light transmittance of 80% or more when the polyimide is formed into a film having a thickness of 10 μm.

[8] A polyimide film obtained from the aqueous polyimide precursor solution composition as described in any one of [1] to [4], wherein the polyimide film has a light transmittance at 400 nm of 60% or more in terms of 10 μm of film thickness.

[9] A polyimide film obtained from the aqueous polyimide precursor solution composition as described in any one of [1] to [4], wherein the polyimide film has a total light transmittance of 80% or more in terms of 10 μm of film thickness.

[10] A method for producing an aqueous polyimide precursor solution composition, comprising
reacting a tetracarboxylic acid component, which comprises an aliphatic tetracarboxylic dianhydride and/or an aromatic tetracarboxylic dianhydride containing a fluorine group in an amount of not less than 50 mol % and comprises an aromatic tetracarboxylic dianhydride containing no fluorine group in an amount of not more than 50 mol %, or alternatively, does not comprise an aromatic tetracarboxylic dianhydride containing no fluorine group, and a diamine component, which comprises an aliphatic diamine having a molecular weight of 500 or less and/or an aromatic diamine containing a fluorine group in an amount of not less than 50 mol % and comprises an aromatic diamine containing no fluorine group and having a solubility in water at 25° C. of 0.1 g/L or more in an amount of not more than 50 mol %, or alternatively, does not comprise an aromatic diamine containing no fluorine group and having a solubility in water at 25° C. of 0.1 g/L or more, in the presence of an imidazole using water as a reaction solvent to provide an aqueous polyimide precursor solution composition.

[11] The method for producing an aqueous polyimide precursor solution composition as described in [10], wherein the amount of the imidazole used is 1.6 mole or more per mole of the tetracarboxylic dianhydride.

[12] Use of the aqueous polyimide precursor solution composition as described in any one of [1] to [4] for the production of an electrical device, an electronic device, an optical device, a display device, a touch panel, a solar battery, or an LED lighting device.

[13] Use of the polyimide as described in any one of [5] to [7] or the polyimide film as described in any one of [8] to [9] as a substrate, or a protective film for an electrical device, an electronic device, an optical device, a display device, a touch panel, a solar battery, or an LED lighting device.

[14] An electrical device, an electronic device, an optical device, a display device, a touch panel, a solar battery, or an LED lighting device comprising the polyimide as described in any one of [5] to [7] or the polyimide film as described in any one of [8] to [9].

[15] A polyimide precursor resin composition for flexible device substrates, wherein
a polyamic acid, which is formed by the reaction of a tetracarboxylic acid component and a diamine component, and consists of a repeating unit represented by the following formula (1), is dissolved in an aqueous solvent together with an imidazole in an amount of 1.6 mole or more per mole of the tetracarboxylic acid component of the polyamic acid.

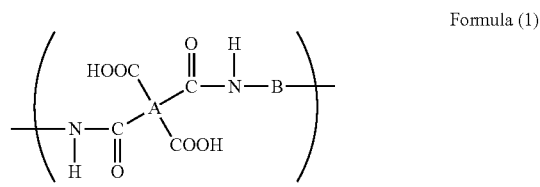

Formula (1)

wherein
A represents at least one selected from the group consisting of a tetravalent group of an aromatic tetracarboxylic acid containing no fluorine group, from which carboxyl groups have been removed, a tetravalent group of an aliphatic tetracarboxylic acid, from which carboxyl groups have been removed, and a tetravalent group of an aromatic tetracarboxylic acid containing a fluorine group, from which carboxyl groups have been removed, and B represents at least one selected from the group consisting of a divalent group of an aromatic diamine containing no fluorine group and having a solubility in water at 25° C. of 0.1 g/L or more, from which amino groups have been removed, a divalent group of an aliphatic diamine having a molecular weight of 500 or less, from which amino groups have been removed, and a divalent group of an aromatic diamine containing a fluorine group, from which amino groups have been removed, with the proviso that
not less than 50 mol % of A is a tetravalent group of an aliphatic tetracarboxylic acid, from which carboxyl groups have been removed, and/or a tetravalent group of an aromatic tetracarboxylic acid containing a fluorine group, from which carboxyl groups have been removed, and not more than 50 mol %, including 0 mol %, of A is a tetravalent group of an aromatic tetracarboxylic acid containing no fluorine group, from which carboxyl groups have been removed, and/or not less than 50 mol % of B is a divalent group of an aliphatic diamine having a molecular weight of 500 or less, from which amino groups have been removed, and/or a divalent group of an aromatic diamine containing a fluorine group, from which amino groups have been removed, and not more than 50 mol %, including 0 mol %, of B is a divalent group of an aromatic diamine containing no fluorine group and having a solubility in water at 25° C. of 0.1 g/L or more, from which amino groups have been removed.

[16] A method for producing a flexible device which is a display device or a light-receiving device, comprising steps of;
applying a polyimide precursor resin composition for flexible device substrates as described in [15] onto a carrier substrate, and then heating the composition to form a solid polyimide resin film;
forming a circuit on the polyimide resin film; and
separating the polyimide resin film on which the circuit is formed from the carrier substrate.

[17] A flexible device produced by a method for producing a flexible device as described in [16], wherein the flexible device is a display device or a light-receiving device.

Effect of the Invention

According to the present invention, there may be provided an aqueous polyimide precursor solution composition which comprises an aqueous solvent and has good environmental acceptability, and may provide a polyimide having high transparency, and having excellent properties such as flexibility, heat resistance, electrical properties, and solvent resistance, and preferably comprises a solvent containing no organic solvent other than water. In addition, according to the present invention, there may be provided an aqueous polyimide precursor solution composition which comprises a polyimide precursor (polyamic acid) having a high molecular weight. A polyimide having excellent properties may be obtained from the aqueous polyimide precursor solution composition. There have been no aqueous polyimide precursor solution compositions from which polyimides having such excellent properties can be obtained. Additionally, a polyimide having particularly high transparency may be obtained when using an aliphatic tetracarboxylic dianhydride and/or an aliphatic diamine having a molecular weight of 500 or less, or alternatively, when using an aromatic tetracarboxylic dianhydride containing a fluorine group (fluorine atom) and/or an aromatic diamine containing a fluorine group (fluorine atom).

The polyimide which is obtained from the aqueous solution composition of the polyimide precursor having a specific composition and prepared according to the present invention, in particular, has high transparency, and has excellent properties such as flexibility, heat resistance, electrical properties, and solvent resistance. Accordingly, the polyimide may be suitably used for an electrical device, an electronic device, and an optical device, and may be suitably used, for example, as a substrate, or a protective film for a display device such as a liquid crystal display, an EL display and an electronic paper, a touch panel, a solar battery, or an LED lighting device, or the like. The polyimide may be particularly suitably used as a substrate of a flexible device, for example, a display device such as a liquid crystal display, an organic EL display and an electronic paper, and a light-receiving device such as a light-receiving element of a thin-film solar battery.

According to the present invention, there may be also provided a polyimide precursor resin composition for flexible device substrates which comprises an aqueous solvent and has good environmental acceptability, and may provide a polyimide substrate for flexible device having high transparency, and having excellent properties such as flexibility, heat resistance, electrical properties, and solvent resistance, and being suitably usable as a substrate for flexible device as a display device such as substrates for a liquid crystal display, an organic EL display and an electronic paper, a substrate for flexible device as a light-receiving device such as a substrate for a thin-film solar battery, and the like, and preferably comprises a solvent containing no organic solvent other than water. The polyimide precursor resin composition for flexible device substrates is preferred because of having high environmental acceptability as compared with a polyimide precursor solution composition comprising an organic solvent. Moreover, the polyimide substrate for flexible device which is obtained from the polyimide precursor resin composition and has a specific composition may have high transparency, and have excellent properties such as flexibility, heat resistance, electrical properties, and solvent resistance, and therefore may be suitably used, for example, as a substrate for flexible device which is a display device such as substrates for a liquid crystal display, an organic EL display and an electronic paper, and as a substrate for flexible device which is a light-receiving device such as a substrate for a thin-film solar battery, in particular, which requires particularly high transparency and flexibility, and may be particularly suitably used as a substrate for a flexible display.

Moreover, according to the present invention, there may be provided a method for easily producing an aqueous polyimide precursor solution composition, which has higher environmental acceptability, without the need for a solvent other than water. According to the production method, an aqueous polyimide precursor solution composition, particularly an aqueous polyimide precursor solution composition comprising an aqueous solvent which has an organic solvent content of less than 5 wt %, further preferably contains no organic solvent, may be very easily (directly) produced. There have been no aqueous polyimide precursor solution compositions having such an extremely low organic solvent content. Now such an aqueous polyimide precursor solution composition may be produced by the production method of the present invention, which allows the reaction of a tetracarboxylic acid component and a diamine component in an aqueous solvent to form a polyimide precursor (polyamic acid).

DETAILED DESCRIPTION OF THE PREFERRED EMBODIMENT

According to the present invention, an aqueous polyimide precursor solution composition is produced by reacting a tetracarboxylic dianhydride and a diamine in the presence of an imidazole, using water as a reaction solvent, provided that not more than 50 mol %, including 0 mol %, of the tetracarboxylic dianhydride to be reacted is an aromatic tetracarboxylic dianhydride containing no fluorine group, preferably an aromatic tetracarboxylic dianhydride having two to three aromatic rings and containing no fluorine group, and not less than 50 mol % of the tetracarboxylic dianhydride to be reacted is an aliphatic tetracarboxylic dianhydride and/or an aromatic tetracarboxylic dianhydride containing a fluorine group, or not more than 50 mol %, including 0 mol %, of the diamine to be reacted is an aromatic diamine having a solubility in water at 25° C. of 0.1 g/L or more and containing no fluorine group, preferably an aromatic diamine having one to two aromatic rings, and having a solubility in water at 25° C. of 0.1 g/L or more and containing no fluorine group, and not less than 50 mol % of the diamine to be reacted is an aliphatic diamine having a molecular weight of 500 or less and/or an aromatic diamine containing a fluorine group, preferably an aromatic diamine having one to two aromatic rings, and containing a fluorine group.

It may be included that not more than 50 mol % of the tetracarboxylic dianhydride to be reacted is an aromatic tetracarboxylic dianhydride containing no fluorine group, preferably an aromatic tetracarboxylic dianhydride having two to three aromatic rings and containing no fluorine group, and not less than 50 mol % of the tetracarboxylic dianhydride to be reacted is an aliphatic tetracarboxylic dianhydride and/or an aromatic tetracarboxylic dianhydride containing a fluorine group, and not more than 50 mol % of the diamine to be reacted is an aromatic diamine having a solubility in water at 25° C. of 0.1 g/L or more and containing no fluorine group, preferably an aromatic diamine having one to two aromatic rings, and having a solubility in water at 25° C. of 0.1 g/L or more and containing no fluorine group, and not less than 50 mol % of the diamine to be reacted is an aliphatic diamine having a molecular weight of 500 or less and/or an aromatic diamine containing a fluorine group, preferably an aromatic diamine having one to two aromatic rings, and containing a fluorine group.

The term "using water as a reaction solvent" means that water is used as the main component of the solvent. Therefore, an organic solvent other than water may be used in a ratio of 50 wt % or less, preferably 30 wt % or less, more preferably 10 wt % or less, relative to the whole solvent. The "organic solvent" as used herein does not include a tetracarboxylic acid component such as tetracarboxylic dianhydride, a diamine component, a polyimide precursor such as polyamic acid, and an imidazole.

Examples of the organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphoric triamide, 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, dimethyl sulfoxide, dimethyl sulfone, diphenyl ether, sulfolane, diphenyl sulfone, tetramethylurea, anisole, m-cresol, phenol, and γ-butyrolactone.

In the method for producing an aqueous polyimide precursor solution composition of the present invention, the reaction solvent is preferably a solvent having an organic solvent content of less than 5 wt %, particularly preferably an aqueous solvent containing no organic solvent other than water, in view of high environmental acceptability. The composition of the reaction solvent may be appropriately selected depending on the intended solvent composition of the aqueous polyimide precursor solution composition to be produced, and it may be preferably the same as the intended solvent composition of the aqueous polyimide precursor solution composition.

Preferable examples of the imidazole (compound) used in the present invention include a compound represented by the following formula (10).

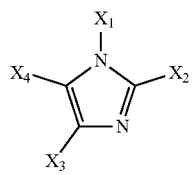

Formula (10)

In the formula (10), $X_1$ to $X_4$ each independently represents a hydrogen atom or an alkyl group having 1 to 5 carbon atoms.

The imidazole used in the present invention preferably has a solubility in water at 25° C. of 0.1 g/L or more, particularly preferably 1 g/L or more.

In the imidazole of the formula (10), $X_1$ to $X_4$ each independently represents a hydrogen atom or an alkyl group having 1 to 5 carbon atoms. An imidazole in which at least two of $X_1$ to $X_4$ are alkyl groups having 1 to 5 carbon atoms, or an imidazole having two or more alkyl groups as substituents is more preferred.

An imidazole having two or more alkyl groups as substituents has high solubility in water, and therefore, when using such an imidazole, an aqueous polyimide precursor solution composition may be easily produced. Preferable examples of the imidazole include 1,2-dimethylimidazole (solubility in water at 25° C.; 239 g/L; the same shall apply hereinafter), 2-ethyl-4-methylimidazole (1000 g/L), 4-ethyl-2-methylimidazole (1000 g/L), and 1-methyl-4-ethylimidazole (54 g/L).

The "solubility in water at 25° C." means the maximum amount (g) of the substance soluble in 1 L (liter) of water at 25° C. This value may be easily searched using SciFinder®, which is known as a search service based on the data bases such as Chemical Abstracts. Among the various values of solubility under various conditions, the values at pH 7, which are calculated by Advanced Chemistry Development (ACD/Labs) Software V11.02 (Copyright 1994-2011 ACD/Labs), are used herein.

The imidazole to be used may be a single imidazole, or may be a mixture of two or more imidazoles.

The amount of the imidazole used in the present invention is preferably 0.8 equivalents or more, more preferably 1.0 equivalent or more, further preferably 1.2 equivalents or more per equivalent of the carboxyl group of the polyamic acid, which is formed by the reaction of a tetracarboxylic dianhydride and a diamine as starting materials. When the amount of the imidazole used is less than 0.8 equivalents per equivalent of the carboxyl group of the polyamic acid, it may not be easy to provide an aqueous polyimide precursor solution composition in which the polyamic acid is homogeneously dissolved. In addition, the upper limit of the amount of the imidazole used may be generally, but not limited to, less than 10 equivalents, preferably less than 5 equivalents, more preferably less than 3 equivalents per equivalent of the carboxyl group of the polyamic acid. If the amount of the imidazole used is too great, it will be uneconomical, and the storage stability of the aqueous polyimide precursor solution composition may be reduced.

In the present invention, the "equivalents per equivalent of the carboxyl group of the polyamic acid", which defines the amount of the imidazole, means the number (number of molecules) of imidazole used per one carboxyl group to form an amic acid group in the polyamic acid. The number of carboxyl groups to form amic acid groups in the polyamic acids may be calculated on the assumption that two carboxyl groups would be formed per one molecule of the tetracarboxylic acid component as a starting material.

Accordingly, the amount of the imidazole used in the present invention is preferably 1.6 mole or more, more preferably 2.0 mole or more, further preferably 2.4 mole or more per mole of the tetracarboxylic dianhydride as a starting material (per mole of the tetracarboxylic acid component of the polyamic acid).

The characteristics of the imidazole used in the present invention are that the imidazole forms a salt with a carboxyl group of a polyamic acid (polyimide precursor), which is formed by the reaction of a tetracarboxylic dianhydride and a diamine as starting materials, thereby increasing the solubility of the polyamic acid in water, and also that the imidazole exhibits a very high catalytic activity during the imidization (dehydration/ring closure) of the polyimide precursor to form a polyimide. Consequently, when using the aqueous polyimide precursor solution composition of the present invention, a polyimide and a substrate for flexible devices, which have very high properties, may be easily produced even though the aqueous polyimide precursor solution composition is heated at a lower temperature for a shorter period of time, for example.

As described above, according to the present invention, an aqueous polyimide precursor solution composition may be very easily (directly) produced preferably by reacting a tetracarboxylic acid component and a diamine component in the presence of an imidazole, preferably in the presence of an imidazole having two or more alkyl groups as substituents, using water as a reaction solvent.

The reaction is performed at a relatively low temperature of 100° C. or lower, preferably 80° C. or lower, so as to suppress the imidization reaction, using substantially equimolar amounts of a tetracarboxylic acid component (tetracarboxylic dianhydride) and a diamine component. The reaction temperature may be generally, but not limited to, from 25° C. to 100° C., preferably from 40° C. to 80° C., more preferably from 50° C. to 80° C. The reaction time may be preferably, but not limited to, from about 0.1 hours to about 24 hours, preferably from about 2 hours to about 12 hours. When setting the reaction temperature and the reaction time within the ranges as described above, an aqueous polyimide precursor solution composition which comprises a polyimide precursor having a high molecular weight may be easily produced with good production efficiency. In general, the reaction may be preferably performed in an inert gas atmosphere, preferably in a nitrogen gas atmosphere, although the reaction may be performed in an air atmosphere.

In addition, the "substantially equimolar amounts of a tetracarboxylic acid component (tetracarboxylic dianhydride) and a diamine component" specifically means that a molar ratio [tetracarboxylic acid component/diamine component] is from about 0.90 to about 1.10, preferably from about 0.95 to about 1.05.

As for the tetracarboxylic dianhydride used in the present invention, not less than 50 mol % thereof is an aliphatic tetracarboxylic dianhydride and/or an aromatic tetracarboxylic dianhydride containing a fluorine group, and not more than 50 mol % thereof is an aromatic tetracarboxylic dianhydride containing no fluorine group, preferably an aromatic tetracarboxylic dianhydride containing no fluorine group and having two to three aromatic rings. However, an aromatic tetracarboxylic dianhydride containing no fluorine group only, or alternatively, a tetracarboxylic acid component comprising an aromatic tetracarboxylic dianhydride containing no fluorine group in an amount of not less than 50 mol % and an aliphatic tetracarboxylic dianhydride and/or an aromatic tetracarboxylic dianhydride containing a fluorine group in an amount of not more than 50 mol % may be used, when not less than 50 mol % of the diamine component to be reacted is an aliphatic diamine having a molecular weight of 500 or less and/or an aromatic diamine containing a fluorine group and not more than 50 mol % of the diamine component to be reacted is an aromatic diamine containing no fluorine group and having a solubility in water at 25° C. of 0.1 g/L or more.

Preferable examples of the aromatic tetracarboxylic dianhydride containing no fluorine group used in the present invention include 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenone tetracarboxylic dianhydride, 4,4'-oxydiphthalic dianhydride, diphenylsulfone tetracarboxylic dianhydride, p-terphenyl tetracarboxylic dianhydride, and m-terphenyl tetracarboxylic dianhydride.

Preferable examples of the aliphatic tetracarboxylic dianhydride used in the present invention include cyclobutane-1,2,3,4-tetracarboxylic dianhydride, 1,2,4,5-cyclohexane tetracarboxylic dianhydride, dicyclohexyl-3,3',4,4'-tetracarboxylic dianhydride, 1,2,4,5-cyclohexane tetracarboxylic acid-1,2:4,5-dianhydride, 1,2,3,4-cyclobutane tetracarboxylic dianhydride, and bicyclo[2.2.2]octo-7-ene-2,3;5,6-tetracarboxylic dianhydride.

Preferable examples of the aromatic tetracarboxylic dianhydride containing a fluorine group used in the present invention include 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H-diflo[3,4-b:3',4'-i]xanthene-1,3,7,9(11H)-tetron, 5,5'-oxybis[4,6,7-trifluoro-pyromellitic anhydride], 3,6-bis(trifluoromethyl)pyromellitic dianhydride, 4-(trifluoromethyl)pyromellitic dianhydride, 1,4-difluoropyromellitic dianhydride, and 1,4-bis(3,4-dicarboxytrifluorophenoxy) tetrafluorobenzene dianhydride.

The aromatic tetracarboxylic dianhydride containing no fluorine group, the aliphatic tetracarboxylic dianhydride, and the aromatic tetracarboxylic dianhydride containing a fluorine group each may not be a single component, and may be a mixture of two or more types thereof.

As for the diamine used in the present invention, not less than 50 mol % thereof is an aliphatic diamine having a molecular weight of 500 or less and/or an aromatic diamine containing a fluorine group, preferably an aromatic diamine containing a fluorine group and having one to two aromatic rings, and not more than 50 mol % thereof is an aromatic diamine having a solubility in water at 25° C. of 0.1 g/L or more and containing no fluorine group, preferably an aromatic diamine having a solubility in water at 25° C. of 0.1 g/L or more and containing no fluorine group and having one to two aromatic rings. However, an aromatic diamine containing no fluorine group only, or alternatively, a diamine component comprising an aromatic diamine containing no fluorine group in an amount of not less than 50 mol % and an aliphatic diamine and/or an aromatic diamine containing a fluorine group in an amount of not more than 50 mol % may be used, when not less than 50 mol % of the tetracarboxylic acid component to be reacted is an aliphatic tetracarboxylic dianhydride and/or an aromatic tetracarboxylic dianhydride containing a fluorine group and not more than 50 mol % of the tetracarboxylic acid component to be reacted is an aromatic tetracarboxylic dianhydride containing no fluorine group.

The aromatic diamine containing no fluorine group used in the present invention is not limited as long as the solubility in water at 25° C. is 0.1 g/L or more, but may be preferably an aromatic diamine having one to two aromatic rings. When an aromatic diamine having a solubility in water at 25° C. of less than 0.1 g/L is used, it may be difficult to provide an aqueous polyimide precursor solution composition in which the polyimide precursor is homogeneously dissolved. Meanwhile, when the aromatic diamine has more than two aromatic rings, the aromatic diamine may have a solubility in water at 25° C. of less than 0.1 g/L, and therefore it may be difficult to provide an aqueous polyimide precursor solution composition in which the polyimide precursor is homogeneously dissolved.

The aliphatic diamine used in the present invention is not limited as long as the molecular weight (which means "molecular weight" in the case of monomer, and "weight average molecular weight" in the case of polymer) is 500 or less, but may be preferably an aliphatic diamine having a solubility in water at 25° C. of 0.1 g/L or more, or an alicyclic diamine having one to two alicyclic rings. When an aliphatic diamine having a molecular weight of more than 500 is used, it may be difficult to provide an aqueous polyimide precursor solution composition in which the polyimide precursor is homogeneously dissolved.

The aromatic diamine containing a fluorine group used in the present invention may be preferably, but not limited to, an aromatic diamine having one to two aromatic rings and containing a fluorine group. When the aromatic diamine containing a fluorine group has more than two aromatic rings, it may be difficult to provide an aqueous polyimide precursor solution composition in which the polyimide precursor is homogeneously dissolved.

Preferable examples of the aromatic diamine containing no fluorine group used in the present invention include p-phenylenediamine (solubility in water at 25° C.: 120 g/L; the same shall apply hereinafter), m-phenylenediamine (77 g/L), 4,4'-diaminodiphenyl ether (0.19 g/L), 3,4'-diaminodiphenyl ether (0.24 g/L), 4,4'-diaminodiphenylmethane (0.54 g/L), 2,4-toluenediamine (62 g/L), 3,3'-dihydroxy-4,4'-diaminobiphenyl (1.3 g/L), bis(4-amino-3-carboxyphenyl)methane (200 g/L), and 2,4-diaminotoluene (62 g/L). Among them, in terms of the high solubility in water, and excellent properties of the polyimide obtained, p-phenylenediamine, m-phenylenediamine, 4,4'-diaminodiphenyl ether, 3,4'-diaminodiphenyl ether, and a mixture thereof are preferred, and p-phenylenediamine, 4,4'-diaminodiphenyl ether, and a mixture thereof are more preferred.

Preferable examples of the aliphatic diamine used in the present invention include trans-1,4-diaminocyclohexane (1000 g/L, molecular weight: 114), cis-1,4-diaminocyclohexane (1000 g/L, molecular weight: 114), 1,6-hexamethylene diamine (1000 g/L, molecular weight: 116), 1,10-decamethylene diamine (1000 g/L, molecular weight: 172), 1,3-bis(aminomethyl)cyclohexane (1000 g/L, molecular weight: 142), 1,4-bis(aminomethyl)cyclohexane (999 g/L, molecular weight: 142), and polyoxypropylene diamine having a weight average molecular weight of 500 or less.

Preferable examples of the aromatic diamine containing a fluorine group used in the present invention include 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 2,2',6,6'-tetrafluoro-(1,1'-biphenyl)-4,4'-diamine, 4,4'-diamino octafluorobiphenyl, 2,2-bis(4-aminophenyl) hexafluoropropane, and 4,4'-oxybis(2,3,5,6-tetrafluoroaniline).

The aromatic diamine containing no fluorine group, the aliphatic diamine, and the aromatic diamine containing a fluorine group each may not be a single component, and may be a mixture of two or more types thereof. As for the aromatic diamine containing no fluorine group, it is also possible to use a diamine which has a high solubility in water in combination with other diamines such that the diamine component has a solubility in water at 25° C. of 0.1 g/L or more as a whole.

The "diamine having a solubility in water at 25° C. of 0.1 g/L or more" means that 0.1 g or more of the diamine is dissolved in 1 L (1000 ml) of water at 25° C. The "solubility in water at 25° C." means the maximum amount (g) of the substance soluble in 1 L (liter) of water at 25° C. This value may be easily searched using SciFinder®, which is known as a search service based on the data bases such as Chemical Abstracts. Among the various values of solubility under various conditions, the values at pH 7, which are calculated by Advanced Chemistry Development (ACD/Labs) Software V11.02 (Copyright 1994-2011 ACD/Labs), are used herein.

The polyamic acid which constitutes the aqueous polyimide precursor solution composition of the present invention consists of a repeating unit represented by the formula (1).

In the formula (1), the "A" group is a chemical structure derived from the tetracarboxylic acid component of a polyamic acid, and is a tetravalent group of an aromatic tetracarboxylic acid containing no fluorine group and preferably having two to three aromatic rings, from which carboxyl groups have been removed, and/or a tetravalent group of an aliphatic tetracarboxylic acid, from which carboxyl groups have been removed, and/or a tetravalent group of an aromatic tetracarboxylic acid containing a fluorine group, from which carboxyl groups have been removed.

As for the "A" group in the formula (1), not more than 50 mol % of A is preferably a tetravalent group of an aromatic tetracarboxylic acid containing no fluorine group and preferably having two to three aromatic rings, from which carboxyl groups have been removed, and not less than 50 mol % of A is preferably a tetravalent group of an aliphatic tetracarboxylic acid, from which carboxyl groups have been removed, and/or a tetravalent group of an aromatic tetracarboxylic acid containing a fluorine group, from which carboxyl groups have been removed, so as to provide a polyamic acid having an adequate solubility in water, and to provide a polyimide having high transparency, thereby easily producing a polyimide substrate for flexible devices, and the like, which have high properties. When not less than 50 mol % of B in the formula (1) is a divalent group of an aliphatic diamine having a molecular weight of 500 or less, from which amino groups have been removed, and/or a divalent group of an aromatic diamine containing a fluorine group, from which amino groups have been removed, and not more than 50 mol % of B is a divalent group of an aromatic diamine containing no fluorine group and having a solubility in water at 25° C. of 0.1 g/L or more, from which amino groups have been removed, however, the "A" group is not limited, and not less than 50 mol % of A may be a tetravalent group of an aromatic tetracarboxylic acid containing no fluorine group, from which carboxyl groups have been removed, and not more than 50 mol % of A may be a tetravalent group of an aliphatic tetracarboxylic acid, from which carboxyl groups have been removed, and/or a tetravalent group of an aromatic tetracarboxylic acid containing a fluorine group, from which carboxyl groups have been removed.

In the present invention, in terms of the properties of the polyimide obtained, the "A" group in the formula (1) which is a constituent unit derived from the aromatic tetracarboxylic dianhydride containing no fluorine group is preferably any one or more of the groups represented by the following formulas (2) to (7), particularly preferably any one or more of the groups represented by the following formulas (2), (3) and (5) in the main, further preferably any one or more of the groups represented by the following formulas (2) to (3).

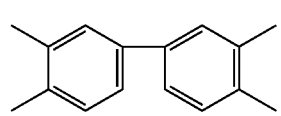

Formula (2)

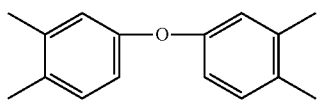

Formula (3)

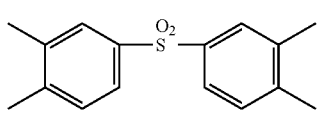

Formula (4)

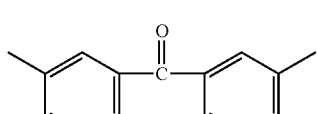

Formula (5)

Formula (6)

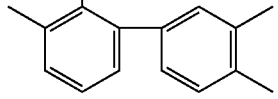

Formula (7)

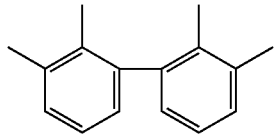

In the formula (1), the "B" group is a chemical structure derived from the diamine component of a polyamic acid, and is a divalent group of an aromatic diamine having a solubility in water at 25° C. of 0.1 g/L or more and containing no fluorine group and preferably having one to two aromatic rings, from which amino groups have been removed, and/or a divalent group of an aliphatic diamine having a molecular weight of 500 or less, preferably an aliphatic diamine having a solubility in water of 0.1 g/L or more, or an aliphatic diamine having one to two alicyclic rings, from which amino groups have been removed, and/or a divalent group of an aromatic diamine containing a fluorine group, preferably an aromatic diamine containing a fluorine group and having one to two aromatic rings, from which amino groups have been removed.

As for the "B" group in the formula (1), not more than 50 mol % of B is preferably a divalent group of an aromatic diamine having a solubility in water at 25° C. of 0.1 g/L or more and containing no fluorine group and preferably having one to two aromatic rings, from which amino groups have been removed, and not less than 50 mol % of B is preferably a divalent group of an aliphatic diamine having a molecular weight of 500 or less, from which amino groups have been removed, and/or a divalent group of an aromatic diamine containing a fluorine group, from which amino groups have been removed, so as to provide a polyamic acid having an adequate solubility in water, and to provide a polyimide having high transparency, thereby easily producing a polyimide substrate for flexible devices, and the like, which have high properties. When not less than 50 mol % of A in the formula (1) is a tetravalent group of an aliphatic tetracarboxylic acid, from which carboxyl groups have been removed, and/or a tetravalent group of an aromatic tetracarboxylic acid containing a fluorine group, from which carboxyl groups have been removed, and not more than 50 mol % of A is a tetravalent group of an aromatic tetracarboxylic acid containing no fluorine group, from which carboxyl groups have been removed, however, the "B" group is not limited, and not less than 50 mol % of B may be a divalent group of an aromatic diamine containing no fluorine group and having a solubility in water at 25° C. of 0.1 g/L or more, from which amino groups have been removed, and not more than 50 mol % of B may be a divalent group of an aliphatic diamine having a molecular weight of 500 or less, from which amino groups have been removed, and/or a divalent group of an aromatic diamine containing a fluorine group, from which amino groups have been removed.

In the present invention, in terms of the properties of the polyimide obtained, the "B" group in the formula (1) which is a constituent unit derived from the aromatic diamine containing no fluorine group is preferably any one or more of the groups represented by the following formulas (8) to (9).

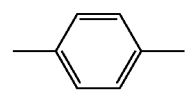

Formula (8)

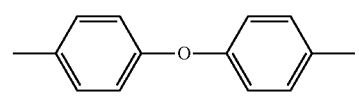

Formula (9)

In the aqueous polyimide precursor solution composition obtained according to the present invention, the polyimide precursor (which is substantially a polyamic acid) may preferably have a high molecular weight; specifically, the inherent viscosity may be preferably, but not limited to, 0.2 or more, preferably 0.4 or more, more preferably 0.6 or more, further preferably 0.8 or more, particularly preferably 1.0 or more, or more than 1.0, wherein the inherent viscosity is measured at a temperature of 30° C. and a concentration of 0.5 g/100 mL (dissolved in water) which is based on the solid content of the polyimide precursor. In one embodiment, when the inherent viscosity is lower than the range as described above, it may be difficult to provide a polyimide, a polyimide substrate for flexible devices, and the like, which have high properties, even if the aqueous polyimide precursor solution composition of the present invention is used, because the polyimide precursor has a low molecular weight.

The solid content based on the polyimide precursor (which is substantially a polyamic acid) of the aqueous polyimide precursor solution composition of the present invention may be preferably, but not limited to, from 5 wt % to 45 wt %, more preferably from 7 wt % to 40 wt %, further preferably from 9 wt % to 30 wt %, relative to the total amount of the polyimide precursor and the solvent. When the solid content is lower than 5 wt %, the productivity and the handling in use may be reduced. When the solid content is higher than 45 wt %, the solution may lose the fluidity.

In view of handling properties, the solution viscosity at 30° C. of the aqueous polyimide precursor solution composition of the present invention may be preferably, but not limited to, 1000 Pa·sec or lower, more preferably from 0.1 Pa·sec to 500 Pa·sec, further preferably from 0.1 Pa·sec to 300 Pa·sec, particularly preferably from 0.1 Pa·sec to 200 Pa·sec. When the solution viscosity is higher than 1000 Pa·sec, the composition may lose the fluidity, and therefore it may be difficult to uniformly apply the composition onto a metal, a glass, and the like. When the solution viscosity is lower than 0.1 Pa·sec, dripping, cissing, and the like may occur when applying the composition onto a metal, a glass, and the like, and it may be difficult to provide a polyimide, a polyimide substrate for flexible devices, and the like, which have high properties.

Although the aqueous polyimide precursor solution composition of the present invention comprises an aqueous solvent, an organic solvent other than water, for example, a known organic solvent to be used in the preparation of a polyamic acid may be used in a ratio of 50 wt % or less, preferably 30 wt % or less, more preferably 10 wt % or less, relative to the whole solvent. In other words, the aqueous polyimide precursor solution composition of the present invention is a composition in which a polyamic acid as a polyimide precursor is dissolved, together with an imidazole, in an aqueous solvent (water-based solvent), wherein the aqueous solvent is only water, or a mixture of water and an organic solvent having a water content of 50 wt % or more, preferably 70 wt % or more, more preferably 90 wt % or more.

Examples of the organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphoric triamide, 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, dimethyl sulfoxide, dimethyl sulfone, diphenyl ether, sulfolane, diphenyl sulfone, tetramethylurea, anisole, m-cresol, phenol, and γ-butyrolactone.

In the aqueous polyimide precursor solution composition of the present invention, the solvent is particularly preferably a solvent having an organic solvent content of less than 5 wt %, more preferably an aqueous solvent containing no organic solvent other than water, i.e. only water, in view of environmental acceptability.

The aqueous polyimide precursor solution composition of the present invention may also be prepared according to the following methods, for example, as described in Patent Literatures 4 and 5:

(i) a method, comprising
pouring a polyamide acid, which is prepared by reacting a tetracarboxylic acid component with a diamine component in an organic solvent as a reaction solvent, into water to provide a polyamide acid powder; and
mixing and dissolving the polyamide acid powder, together with an imidazole (preferably, an imidazole having two or more alkyl groups), into an aqueous solvent to provide an aqueous solution composition;

(ii) a method, comprising
reacting a tetracarboxylic acid component with a diamine component in an organic solvent as a reaction solvent in the presence of an imidazole (preferably, an imidazole having two or more alkyl groups) to provide a water-soluble polyimide precursor;
separating the water-soluble polyimide precursor therefrom; and
dissolving the separated water-soluble polyimide precursor in an aqueous solvent; and (iii) a method, comprising
reacting a tetracarboxylic acid component with a diamine component in an organic solvent as a reaction solvent to provide a polyamic acid;
reacting the polyamic acid with an imidazole (preferably, an imidazole having two or more alkyl groups) in an organic solvent as a reaction solvent to provide a water-soluble polyimide precursor;
separating the water-soluble polyimide precursor therefrom; and
dissolving the separated water-soluble polyimide precursor in an aqueous solvent.

As described above, however, in order to obtain an aqueous polyimide precursor solution composition having an extremely low organic solvent content, or containing no organic solvent, it is not preferred that a polyimide precursor is prepared in an organic solvent.

Generally, a polyimide may be suitably prepared by heating the aqueous polyimide precursor solution composition of the present invention to remove an aqueous solvent and effect imidization (dehydration/ring closure). The heat treatment conditions are not limited, but, in general, the aqueous polyimide precursor solution composition may be preferably heated at a temperature of 100° C. or higher, preferably from 120° C. to 600° C., more preferably from 150° C. to 500° C., further preferably from 150° C. to 350° C., for from 0.01 hours to 30 hours, preferably from 0.01 hours to 10 hours, preferably while increasing the temperature stepwise.

The heat treatment may be suitably performed under atmospheric pressure, and may be performed under reduced pressure so as to efficiently remove the aqueous solvent. The aqueous polyimide precursor solution composition may be heated at a relatively low temperature under reduced pressure at the early stage for deaeration. When the heating temperature is rapidly increased, a problem such as foaming may occur, and therefore a polyimide having good properties may not be obtained.

The aqueous polyimide precursor solution composition of the present invention may be heated at a relatively low temperature (for example, 150° C. to 300° C., preferably 180° C. to 250° C.) to readily provide a polyimide, which is in no way inferior to a polyimide obtained from a commonly-used polyimide precursor (polyamic acid) solution composition comprising an organic solvent, and has excellent properties.

A polyimide obtained from the aqueous polyimide precursor solution composition of the present invention may have high transparency. According to the present invention, there may be provided a polyimide film which has a light transmittance at 400 nm of 60% or more, further 70% or more, further 80% or more, further 85% or more, in terms of 10 μm of film thickness, for example, using the aqueous polyimide precursor solution composition of the present invention. According to the present invention, there may be also provided a polyimide film which has a total light transmittance of 80% or more, further 85% or more, further 90% or more, in terms of 10 μm of film thickness, for example, using the aqueous polyimide precursor solution composition of the present invention.

Because a polyimide obtained from the aqueous polyimide precursor solution composition of the present invention may have high transparency, the polyimide may be suitably used for an electrical device, an electronic device, and an optical device, which require transparency, and may be suitably used, for example, as a substrate, or a protective film for a display device such as a liquid crystal display, an EL display and an electronic paper, a touch panel, a solar battery, or an LED lighting device, or the like. The polyimide may be particularly suitably used as a substrate of a flexible device, for example, a display device such as a liquid crystal display, an organic EL display and an electronic paper, and a light-receiving device such as a light-receiving element of a thin-film solar battery.

The aqueous polyimide precursor solution composition of the present invention may contain other additive component(s) depending on the intended application of the polyimide obtained.

The aqueous polyimide precursor solution composition of the present invention may be particularly suitably used as a polyimide precursor resin composition for flexible device substrates.

According to the method for producing the flexible device of the present invention, a coating film of an aqueous polyimide precursor solution composition layer is formed on a substrate by applying or spraying an aqueous polyimide precursor solution composition (specifically, an aqueous polyimide precursor solution composition in which a polyamic acid consisting of a repeating unit represented by the formula (1) is homogeneously dissolved in an aqueous solvent together with an imidazole in an amount of 1.6 mole or more per mole of the tetracarboxylic acid component of the polyamic acid) onto the substrate surface, and then the aqueous polyimide precursor solution composition is heated to provide a polyimide substrate for flexible devices.

According to the present invention, a polyimide substrate for flexible devices may be suitably prepared by heating the aqueous polyimide precursor solution composition to remove an aqueous solvent and effect imidization (dehydration/ring closure). The heat treatment conditions are not limited, but, in general, the aqueous polyimide precursor solution composition may be preferably heated at a temperature of 100° C. or higher, preferably from 120° C. to 600° C., more preferably from 150° C. to 500° C., further preferably from 150° C. to 350° C., for from 0.01 hours to 30 hours, preferably from 0.01 hours to 10 hours, preferably while increasing the temperature stepwise.

The heat treatment may be suitably performed under atmospheric pressure, and may be performed under reduced pressure so as to efficiently remove the aqueous solvent. The aqueous polyimide precursor solution composition may be heated at a relatively low temperature under reduced pressure at the early stage for deaeration. When the heating temperature is rapidly increased, a problem such as foaming may occur, and therefore a good flexible device substrate may not be obtained.

According to the method for producing the polyimide substrate for flexible devices of the present invention, the aqueous polyimide precursor solution composition may be heated at a relatively low temperature (for example, 150° C. to 300° C., preferably 180° C. to 250° C.) to readily provide a polyimide substrate for flexible devices, which has excellent properties, and is in no way inferior to a polyimide substrate obtained from a commonly-used polyimide precursor (polyamic acid) solution composition comprising an organic solvent.

According to the method for producing the flexible device of the present invention, a solid polyimide resin film is formed on a carrier substrate as a support by applying a polyimide precursor resin composition (aqueous polyimide precursor solution composition) onto the carrier substrate, and heating the composition; a circuit is formed on the polyimide resin film; and then the polyimide resin film on which the circuit is formed is separated from the carrier substrate.

Any method for applying an aqueous polyimide precursor solution composition may be applied, as long as a coating film having a uniform thickness is formed on a carrier substrate (support). For example, die coating, spin coating, and screen printing may be employed for the application.

A substrate for flexible devices may be suitably produced by a method, comprising
forming a coating film of an aqueous polyimide precursor solution composition on a carrier substrate;
heating the coating film at a relatively low temperature to effect the removal of the aqueous solvent, thereby forming a self-supporting film (the film in a state of not flowing; the polymerization and partial imidization reaction, as well as the removal of the aqueous solvent, proceed.); and
heating the self-supporting film on the substrate, or alternatively, the self-supporting film which is peeled from the substrate, if necessary, to effect dehydration/imidization.

The terms "removal of the aqueous solvent" and "dehydration/imidization" as used herein do not mean that only the removal of the aqueous solvent proceeds and only the dehydration/imidization proceeds, respectively, in the steps. In the aqueous solvent removal step, the dehydration/imidization proceeds to some extent. In the dehydration/imidization step, the removal of the residual aqueous solvent proceeds.

The aqueous polyimide precursor solution composition of the present invention may contain other additive component(s) depending on the intended application of the polyimide substrate for flexible devices obtained. Additionally, another resin layer may be laminated on the polyimide substrate for flexible devices obtained.

In the method for producing the flexible device of the present invention, the thickness of the polyimide resin film is desirably from 1 μm to 20 μm. When the thickness is less than 1 μm, the polyimide resin film may not remain adequately resistant, and therefore the polyimide resin film may not withstand stress and may be broken when used as a flexible device substrate. When the thickness of the polyimide resin film is more than 20 μm and greater, it may be difficult to achieve the thinning of the flexible device. The thickness of the polyimide resin film is more desirably from 2 μm to 10 μm so as to achieve the further thinning, while maintaining an adequate resistance for the flexible device.

According to the method for producing the flexible device of the present invention, a circuit needed for a display device or a light-receiving device is formed on the polyimide resin film formed as described above. This step differs from device to device. For example, in the case of the production of a TFT liquid crystal display device, a TFT of amorphous silicon, for example, is formed on the polyimide resin film. The TFT comprises a gate metal layer, a silicon nitride gate dielectric layer, and an ITI pixel electrode. In addition, a structure needed for a liquid crystal display may be formed thereon by a known method. The method for forming a circuit, and the like is not limited because the polyimide resin film obtained according to the present invention has excellent properties such as heat resistance, and toughness.

The polyimide resin film on which the circuit etc. is formed as described above is separated from the carrier substrate. The method for the separation is not limited. For example, the polyimide resin film on which the circuit is formed may be separated from the carrier substrate by irradiation with laser or the like from the carrier substrate side. Because the polyimide resin film obtained according to the present invention has high flexibility and toughness, it may be physically separated from the carrier substrate (support) simply.

Examples of the flexible device in the present invention include display devices such as a liquid crystal display, an organic EL display and an electronic paper, and light-receiving devices such as a solar battery and CMOS. The present invention may be particularly suitably applied to devices to be thinner and flexible.

EXAMPLES

Hereinafter, the present invention will be more specifically described with reference to Examples and Comparative Examples, but the present invention is not limited to these Examples.

The methods for measuring the properties, which was used in the following examples, will be described below.

<Solid Content>

A sample solution (the weight is referred to as "w1") was heated at 120° C. for 10 minutes, 250° C. for 10 minutes, and then 350° C. for 30 minutes in a hot air dryer, and the weight of the sample after the heat treatment (the weight is referred to as "w2") was measured. The solid content [wt %] was calculated by the following formula.

Solid content[wt %]=(w2/w1)×100

<Inherent Viscosity>

A sample solution was diluted to a concentration of 0.5 g/dl based on the solid content (the solvent:water). The flowing time ($T_1$) of the diluted solution was measured at 30° C. using a Cannon-Fenske viscometer No. 100. The inherent viscosity was calculated by the following formula using the flowing time ($T_0$) of the blank water.

Inherent viscosity={ln($T_1$/$T_0$)}/0.5

<Solution Viscosity (Rotational Viscosity)>

The solution viscosity was measured at 30° C. using an E type viscometer manufactured by Tokimec, Inc.

<Observation of State of Polyimide Substrate for Flexible Device>

An article in which no defects such as foaming and crack were observed was evaluated as ○, and an article in which defects such as foaming and crack were observed in not more than 30% of the whole area was evaluated as Δ, and an article in which defects such as foaming and crack were observed in more than 30% of the whole area was evaluated as ×.

<Measurement of Light Transmittance>

The total light transmittance and light transmittance at 400 nm in terms of 10 μm of film thickness of the polyimide substrate for flexible device were measured using a light-transmittance measuring device (MCPD-300 manufactured by Otsuka Electronics Co., Ltd.).

The abbreviations of the compounds used in the following examples are as follows:

s-BPDA: 3,3',4,4'-biphenyltetracarboxylic dianhydride
ODPA: 4,4'-oxydiphthalic dianhydride
6FDA: 4,4'-(hexafluoroisopropylidene)diphthalic anhydride
t-DCDA: trans-dicyclohexyl-3,3',4,4'-tetracarboxylic dianhydride
c-DCDA: cis-dicyclohexyl-3,3',4,4'-tetracarboxylic dianhydride
ODA: 4,4'-diaminodiphenyl ether (solubility in water at 25° C.: 0.19 g/L)
PPD: p-phenylenediamine (solubility in water at 25° C.: 120 g/L)
t-CHDA: trans-1,4-diaminocyclohexane (solubility in water at 25° C.: 1000 g/L, molecular weight: 114)
HMD: 1,6-hexamethylene diamine (solubility in water at 25° C.: 1000 g/L, molecular weight: 116)
DAB: 1,4-diaminobutane (solubility in water at 25° C.: 1000 g/L, molecular weight: 88)
DAP: 1,3-propanediamine (solubility in water at 25° C.: 1000 g/L, molecular weight: 74)
D2000: JEFFAMINE D2000 (manufactured by Mitsui Chemicals, Inc., diamine compound having a weight average molecular weight of 2041)
1074: PRIAMINE 1074 (manufactured by Croda Japan KK, diamine compound having a weight average molecular weight of 548)
1,2-DMZ: 1,2-dimethylimidazole (solubility in water at 25° C.: 239 g/L)

Example 1

In a 500 mL (internal volume) glass reaction vessel equipped with a stirrer and a nitrogen-gas charging/discharging tube was placed 425 g of water as a solvent. And then, 20.97 g (0.184 mol) of t-CHDA, and 44.14 g (1.25 equivalents per carboxyl group) of 1,2-DMZ were added thereto, and the mixture was stirred at 25° C. for 1 hour to dissolve these compounds in water. Subsequently, 54.03 g (0.184 mol) of s-BPDA was added to the resulting solution, and the mixture was stirred at 70° C. for 6 hours to provide an aqueous polyimide precursor solution having a solid content of 12.8 wt %, a solution viscosity of 1.2 Pa·s, and an inherent viscosity of 0.72.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 2

In a 500 mL (internal volume) glass reaction vessel equipped with a stirrer and a nitrogen-gas charging/discharging tube was placed 425 g of water as a solvent. And then, 21.24 g (0.183 mol) of HMD, and 43.92 g (1.25 equivalents per carboxyl group) of 1,2-DMZ were added thereto, and the mixture was stirred at 25° C. for 1 hour to dissolve these compounds in water. Subsequently, 53.76 g (0.183 mol) of s-BPDA was added to the resulting solution, and the mixture was stirred at 70° C. for 6 hours to provide an aqueous polyimide precursor solution having a solid content of 12.4 wt %, a solution viscosity of 0.7 Pa·s, and an inherent viscosity of 0.63.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 3

In a 500 mL (internal volume) glass reaction vessel equipped with a stirrer and a nitrogen-gas charging/discharging tube was placed 425 g of water as a solvent. And then, 17.29 g (0.196 mol) of DAB, and 47.15 g (1.25 equivalents per carboxyl group) of 1,2-DMZ were added thereto, and the mixture was stirred at 25° C. for 1 hour to dissolve these compounds in water. Subsequently, 57.71 g (0.196 mol) of s-BPDA was added to the resulting solution, and the mixture was stirred at 70° C. for 6 hours to provide an aqueous polyimide precursor solution having a solid content of 12.2 wt %, a solution viscosity of 0.3 Pa·s, and an inherent viscosity of 0.45.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 4

In a 500 mL (internal volume) glass reaction vessel equipped with a stirrer and a nitrogen-gas charging/discharging tube was placed 425 g of water as a solvent. And then, 20.55 g (0.180 mol) of t-CHDA, and 43.24 g (1.25 equivalents per carboxyl group) of 1,2-DMZ were added thereto, and the mixture was stirred at 25° C. for 1 hour to dissolve these compounds in water. Subsequently, 15.88 g (0.054 mol) of s-BPDA and 38.57 g (0.126 mol) of c-DCDA were added to the resulting solution, and the mixture was stirred at 70° C. for 6 hours to provide an aqueous polyimide precursor solution having a solid content of 12.2 wt %, a solution viscosity of 0.1 Pa·s, and an inherent viscosity of 0.27.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 5

In a 500 mL (internal volume) glass reaction vessel equipped with a stirrer and a nitrogen-gas charging/discharging tube was placed 425 g of water as a solvent. And then, 20.18 g (0.177 mol) of t-CHDA, and 42.48 g (1.25 equivalents per carboxyl group) of 1,2-DMZ were added thereto, and the mixture was stirred at 25° C. for 1 hour to dissolve these compounds in water. Subsequently, 54.82 g (0.177 mol) of ODPA was added to the resulting solution, and the mixture was stirred at 70° C. for 6 hours to provide an aqueous polyimide precursor solution having a solid content of 12.5 wt %, a solution viscosity of 0.1 Pa·s, and an inherent viscosity of 0.43.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 6

In a 500 mL (internal volume) glass reaction vessel equipped with a stirrer and a nitrogen-gas charging/discharging tube was placed 425 g of water as a solvent. And then, 23.31 g (0.116 mol) of ODA, and 27.97 g (1.25 equivalents per carboxyl group) of 1,2-DMZ were added thereto, and the mixture was stirred at 25° C. for 1 hour to dissolve these compounds in water. Subsequently, 51.69 g (0.116 mol) of 6FDA was added to the resulting solution, and the mixture was stirred at 70° C. for 6 hours to provide an aqueous polyimide precursor solution having a solid content of 13.0 wt %, a solution viscosity of 2.5 Pa·s, and an inherent viscosity of 0.13.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 7

In a 500 mL (internal volume) glass reaction vessel equipped with a stirrer and a nitrogen-gas charging/discharging tube was placed 425 g of water as a solvent. And then, 14.69 g (0.136 mol) of PPD, and 32.64 g (1.25 equivalents per carboxyl group) of 1,2-DMZ were added thereto, and the mixture was stirred at 25° C. for 1 hour to dissolve these compounds in water. Subsequently, 60.31 g (0.136 mol) of 6FDA was added to the resulting solution, and the mixture was stirred at 70° C. for 6 hours to provide an aqueous polyimide precursor solution having a solid content of 13.4 wt %, a solution viscosity of 4.5 Pa·s, and an inherent viscosity of 0.62.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 8

In a 500 mL (internal volume) glass reaction vessel equipped with a stirrer and a nitrogen-gas charging/discharging tube was placed 425 g of water as a solvent. And then, 15.34 g (0.134 mol) of t-CHDA, and 32.28 g (1.25 equivalents per carboxyl group) of 1,2-DMZ were added thereto, and the mixture was stirred at 25° C. for 1 hour to dissolve these compounds in water. Subsequently, 59.66 g (0.134 mol) of 6FDA was added to the resulting solution, and the mixture was stirred at 70° C. for 6 hours to provide an aqueous polyimide precursor solution having a solid content of 12.2 wt %, a solution viscosity of 0.1 Pa·s, and an inherent viscosity of 0.40.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-1.

Example 9

In a 500 mL (internal volume) glass reaction vessel equipped with a stirrer and a nitrogen-gas charging/discharging tube was placed 425 g of water as a solvent. And then, 20.37 g (0.178 mol) of t-CHDA, and 42.87 g (1.25 equivalents per carboxyl group) of 1,2-DMZ were added thereto, and the mixture was stirred at 25° C. for 1 hour to dissolve these compounds in water. Subsequently, 54.63 g (0.178 mol) of t-DCDA was added to the resulting solution, and the mixture was stirred at 70° C. for 6 hours to provide an aqueous polyimide precursor solution having a solid content of 12.4 wt %, a solution viscosity of 0.5 Pa·s, and an inherent viscosity of 0.20.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 10

In a 500 mL (internal volume) glass reaction vessel equipped with a stirrer and a nitrogen-gas charging/discharging tube was placed 425 g of water as a solvent. And then, 20.63 g (0.178 mol) of HMD, and 42.67 g (1.25 equivalents per carboxyl group) of 1,2-DMZ were added thereto, and the mixture was stirred at 25° C. for 1 hour to dissolve these compounds in water. Subsequently, 54.37 g (0.178 mol) of t-DCDA was added to the resulting solution, and the mixture was stirred at 70° C. for 6 hours to provide an aqueous polyimide precursor solution having a solid content of 12.2 wt %, a solution viscosity of 0.6 Pa·s, and an inherent viscosity of 0.25.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 11

In a 500 mL (internal volume) glass reaction vessel equipped with a stirrer and a nitrogen-gas charging/discharging tube was placed 425 g of water as a solvent. And then, 16.76 g (0.190 mol) of DAB, and 45.70 g (1.25 equivalents per carboxyl group) of 1,2-DMZ were added thereto, and the mixture was stirred at 25° C. for 1 hour to dissolve these compounds in water. Subsequently, 58.24 g (0.190 mol) of t-DCDA was added to the resulting solution, and the mixture was stirred at 70° C. for 6 hours to provide an aqueous polyimide precursor solution having a solid content of 12.3 wt %, a solution viscosity of 0.4 Pa·s, and an inherent viscosity of 0.25.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 12

In a 500 mL (internal volume) glass reaction vessel equipped with a stirrer and a nitrogen-gas charging/discharging tube was placed 425 g of water as a solvent. And then, 14.61 g (0.197 mol) of DAP, and 47.39 g (1.25 equivalents per carboxyl group) of 1,2-DMZ were added thereto, and the mixture was stirred at 25° C. for 1 hour to dissolve these compounds in water. Subsequently, 60.39 g (0.197 mol) of t-DCDA was added to the resulting solution, and the mixture was stirred at 70° C. for 6 hours to provide an aqueous polyimide precursor solution having a solid content of 12.0 wt %, a solution viscosity of 0.3 Pa·s, and an inherent viscosity of 0.27.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 13

In a 500 mL (internal volume) glass reaction vessel equipped with a stirrer and a nitrogen-gas charging/discharging tube was placed 425 g of water as a solvent. And then, 20.37 g (0.178 mol) of t-CHDA, and 42.87 g (1.25 equivalents per carboxyl group) of 1,2-DMZ were added thereto, and the mixture was stirred at 25° C. for 1 hour to dissolve these compounds in water. Subsequently, 54.63 g (0.178 mol) of c-DCDA was added to the resulting solution, and the mixture was stirred at 70° C. for 6 hours to provide an aqueous polyimide precursor solution having a solid content of 12.2 wt %, a solution viscosity of 0.4 Pa·s, and an inherent viscosity of 0.18.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 14

In a 500 mL (internal volume) glass reaction vessel equipped with a stirrer and a nitrogen-gas charging/discharging tube was placed 425 g of water as a solvent. And then, 20.63 g (0.178 mol) of HMD, and 42.67 g (1.25 equivalents per carboxyl group) of 1,2-DMZ were added thereto, and the mixture was stirred at 25° C. for 1 hour to dissolve these compounds in water. Subsequently, 54.37 g (0.178 mol) of c-DCDA was added to the resulting solution, and the mixture was stirred at 70° C. for 6 hours to provide an aqueous polyimide precursor solution having a solid content of 12.2 wt %, a solution viscosity of 0.5 Pa·s, and an inherent viscosity of 0.18.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 15

In a 500 mL (internal volume) glass reaction vessel equipped with a stirrer and a nitrogen-gas charging/discharging tube was placed 425 g of water as a solvent. And then, 16.76 g (0.190 mol) of DAB, and 45.70 g (1.25 equivalents per carboxyl group) of 1,2-DMZ were added thereto, and the mixture was stirred at 25° C. for 1 hour to dissolve these compounds in water. Subsequently, 58.24 g (0.190 mol) of c-DCDA was added to the resulting solution, and the mixture was stirred at 70° C. for 6 hours to provide an aqueous polyimide precursor solution having a solid content of 12.3 wt %, a solution viscosity of 0.2 Pa·s, and an inherent viscosity of 0.19.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 16

In a 500 mL (internal volume) glass reaction vessel equipped with a stirrer and a nitrogen-gas charging/discharging tube was placed 425 g of water as a solvent. And then, 14.61 g (0.197 mol) of DAP, and 47.39 g (1.25 equivalents per carboxyl group) of 1,2-DMZ were added thereto, and the mixture was stirred at 25° C. for 1 hour to dissolve these compounds in water. Subsequently, 60.39 g (0.197 mol) of c-DCDA was added to the resulting solution, and the mixture was stirred at 70° C. for 6 hours to provide an aqueous polyimide precursor solution having a solid content of 12.0 wt %, a solution viscosity of 0.1 Pa·s, and an inherent viscosity of 0.17.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-2.

Example 17

In a 500 mL (internal volume) glass reaction vessel equipped with a stirrer and a nitrogen-gas charging/discharging tube was placed 425 g of water as a solvent. And then, 8.64 g (0.043 mol) of ODA and 15.05 g (0.129 mol) of HMD, and 41.49 g (1.25 equivalents per carboxyl group) of 1,2-DMZ were added thereto, and the mixture was stirred at 25° C. for 1 hour to dissolve these compounds in water. Subsequently, 38.09 g (0.129 mol) of s-BPDA and 13.22 g (0.043 mol) of t-DCDA were added to the resulting solution, and the mixture was stirred at 70° C. for 6 hours to provide an aqueous polyimide precursor solution having a solid content of 12.1 wt %, a solution viscosity of 1.2 Pa·s, and an inherent viscosity of 0.49.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-3.

Example 18

In a 500 mL (internal volume) glass reaction vessel equipped with a stirrer and a nitrogen-gas charging/discharging tube was placed 425 g of water as a solvent. And then, 19.24 g (0.096 mol) of ODA and 3.66 g (0.032 mol) of t-CHDA, and 30.79 g (1.25 equivalents per carboxyl group) of 1,2-DMZ were added thereto, and the mixture was stirred at 25° C. for 1 hour to dissolve these compounds in water. Subsequently, 9.42 g (0.032 mol) of s-BPDA and 42.68 g (0.096 mol) of 6FDA were added to the resulting solution, and the mixture was stirred at 70° C. for 6 hours to provide an aqueous polyimide precursor solution having a solid content of 13.4 wt %, a solution viscosity of 4.5 Pa·s, and an inherent viscosity of 0.22.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-3.

Example 19

In a 500 mL (internal volume) glass reaction vessel equipped with a stirrer and a nitrogen-gas charging/discharging tube was placed 400 g of water as a solvent. And then, 9.37 g (0.047 mol) of ODA and 21.76 g (0.187 mol) of HMD, and 56.26 g (1.25 equivalents per carboxyl group) of 1,2-DMZ were added thereto, and the mixture was stirred at 25° C. for 1 hour to dissolve these compounds in water. Subsequently, 68.87 g (0.234 mol) of s-BPDA was added to the resulting solution, and the mixture was stirred at 70° C. for 6 hours to provide an aqueous polyimide precursor solution having a solid content of 16.0 wt %, a solution viscosity of 0.7 Pa·s, and an inherent viscosity of 0.72.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-3.

Example 20

In a 500 mL (internal volume) glass reaction vessel equipped with a stirrer and a nitrogen-gas charging/discharging tube was placed 400 g of water as a solvent. And then, 5.29 g (0.049 mol) of PPD and 22.74 g (0.196 mol) of HMD, and 58.80 g (1.25 equivalents per carboxyl group) of 1,2-DMZ were added thereto, and the mixture was stirred at 25° C. for 1 hour to dissolve these compounds in water. Subsequently, 71.97 g (0.245 mol) of s-BPDA was added to the resulting solution, and the mixture was stirred at 70° C. for 6 hours to provide an aqueous polyimide precursor solution having a solid content of 15.7 wt %, a solution viscosity of 1.4 Pa·s, and an inherent viscosity of 0.86.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 1-3.

Reference Example 1

In a 500 mL (internal volume) glass reaction vessel equipped with a stirrer and a nitrogen-gas charging/discharging tube was placed 450 g of water as a solvent. And then, 20.25 g (0.101 mol) of ODA, and 24.31 g (1.25 equivalents per carboxyl group) of 1,2-DMZ were added thereto, and the mixture was stirred at 25° C. for 1 hour to dissolve these compounds in water. Subsequently, 29.75 g (0.101 mol) of s-BPDA was added to the resulting solution, and the mixture was stirred at 70° C. for 6 hours to provide an aqueous polyimide precursor solution having a solid content of 8.7 wt %, a solution viscosity of 32.0 Pa·s, and an inherent viscosity of 0.42.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 2

In a 500 mL (internal volume) glass reaction vessel equipped with a stirrer and a nitrogen-gas charging/discharging tube was placed 450 g of water as a solvent. And then, 13.44 g (0.124 mol) of PPD, and 29.87 g (1.25 equivalents per carboxyl group) of 1,2-DMZ were added thereto, and the mixture was stirred at 25° C. for 1 hour to dissolve these compounds in water. Subsequently, 36.56 g (0.124 mol) of s-BPDA was added to the resulting solution, and the mixture was stirred at 70° C. for 6 hours to provide an aqueous polyimide precursor solution having a solid content of 9.1 wt %, a solution viscosity of 63.0 Pa·s, and an inherent viscosity of 1.86.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 3

In a 500 mL (internal volume) glass reaction vessel equipped with a stirrer and a nitrogen-gas charging/discharging tube was placed 450 g of water as a solvent. And then, 11.16 g (0.056 mol) of ODA and 6.03 g (0.056 mol) of PPD, and 26.80 g (1.25 equivalents per carboxyl group) of 1,2-DMZ were added thereto, and the mixture was stirred at 25° C. for 1 hour to dissolve these compounds in water. Subsequently, 32.81 g (0.112 mol) of s-BPDA was added to the resulting solution, and the mixture was stirred at 70° C. for 6 hours to provide an aqueous polyimide precursor solution having a solid content of 8.7 wt %, a solution viscosity of 52.2 Pa·s, and an inherent viscosity of 0.54.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 4

In a 500 mL (internal volume) glass reaction vessel equipped with a stirrer and a nitrogen-gas charging/discharging tube was placed 400 g of water as a solvent. And then, 16.03 g (0.148 mol) of PPD and 11.29 g (0.099 mol) of t-CHDA, and 59.38 g (1.25 equivalents per carboxyl group) of 1,2-DMZ were added thereto, and the mixture was stirred at 25° C. for 1 hour to dissolve these compounds in water. Subsequently, 72.68 g (0.247 mol) of s-BPDA was added to the resulting solution, and the mixture was stirred at 70° C. for 6 hours to provide an aqueous polyimide precursor solution having a solid content of 16.7 wt %, a solution viscosity of 27.2 Pa·s, and an inherent viscosity of 1.04.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 5

In a 500 mL (internal volume) glass reaction vessel equipped with a stirrer and a nitrogen-gas charging/discharging tube was placed 400 g of water as a solvent. And then, 18.70 g (0.173 mol) of PPD and 8.61 g (0.074 mol) of HMD, and 59.38 g (1.25 equivalents per carboxyl group) of 1,2-DMZ were added thereto, and the mixture was stirred at 25° C. for 1 hour to dissolve these compounds in water. Subsequently, 72.68 g (0.247 mol) of s-BPDA was added to the resulting solution, and the mixture was stirred at 70° C. for 6 hours to provide an aqueous polyimide precursor solution having a solid content of 16.1 wt %, a solution viscosity of 30.2 Pa·s, and an inherent viscosity of 0.82.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 6

In a 500 mL (internal volume) glass reaction vessel equipped with a stirrer and a nitrogen-gas charging/discharging tube was placed 400 g of water as a solvent. And then, 26.64 g (0.246 mol) of PPD, and 59.20 g (1.25 equivalents per carboxyl group) of 1,2-DMZ were added thereto, and the mixture was stirred at 25° C. for 1 hour to dissolve these compounds in water. Subsequently, 50.73 g (0.172 mol) of s-BPDA and 22.63 g (0.074 mol) of t-DCDA were added to the resulting solution, and the mixture was stirred at 70° C. for 6 hours to provide an aqueous polyimide precursor solution having a solid content of 16.2 wt %, a solution viscosity of 107.5 Pa·s, and an inherent viscosity of 0.87.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Reference Example 7

In a 500 mL (internal volume) glass reaction vessel equipped with a stirrer and a nitrogen-gas charging/discharging tube was placed 400 g of water as a solvent. And then, 28.36 g (0.262 mol) of PPD, and 63.03 g (1.25 equivalents per carboxyl group) of 1,2-DMZ were added thereto, and the mixture was stirred at 25° C. for 1 hour to dissolve these compounds in water. Subsequently, 54.00 g (0.184 mol) of s-BPDA and 17.63 g (0.079 mol) of H-PMDA were added to the resulting solution, and the mixture was stirred at 70° C. for 6 hours to provide an aqueous polyimide precursor solution having a solid content of 16.5 wt %, a solution viscosity of 8.7 Pa·s, and an inherent viscosity of 0.60.

The aqueous polyimide precursor solution composition obtained was applied on a glass plate as a substrate with a bar coater. The resulting coating film was deaerated and predried at 25° C. for 30 minutes under reduced pressure. Subsequently, the predried coating film was placed into a hot air dryer and heated at 80° C. for 30 minutes, 120° C. for 30 minutes, 200° C. for 10 minutes, and then 250° C. for 10 minutes under atmospheric pressure, to provide a polyimide substrate for flexible device having a thickness of 10 μm.

The results of the state observations and the properties evaluations of the aqueous polyimide precursor solution composition and the polyimide substrate for flexible device obtained are shown in Table 2.

Comparative Example 1

In a 500 mL (internal volume) glass reaction vessel equipped with a stirrer and a nitrogen-gas charging/discharging tube was placed 400 g of water as a solvent. And then, 17.35 g (0.149 mol) of HMD and 33.85 g (0.017 mol) of JEFFAMINE D2000, and 39.87 g (1.25 equivalents per carboxyl group) of 1,2-DMZ were added thereto, and the mixture was stirred at 25° C. for 1 hour to dissolve these compounds in water. Subsequently, 48.80 g (0.166 mol) of s-BPDA was added to the resulting solution, and the mixture was stirred at 70° C. for 6 hours. Still, s-BPDA was not dissolved therein homogeneously, and an aqueous polyimide precursor solution composition could not be obtained.

The results are shown in Table 3.

Comparative Example 2

In a 500 mL (internal volume) glass reaction vessel equipped with a stirrer and a nitrogen-gas charging/discharging tube was placed 400 g of water as a solvent. And then, 23.06 g (0.198 mol) of HMD and 12.07 g (0.022 mol) of PRIAMINE 1074, and 53.00 g (1.25 equivalents per carboxyl group) of 1,2-DMZ were added thereto, and the mixture was stirred at 25° C. for 1 hour to dissolve these compounds in water. Subsequently, 64.87 g (0.220 mol) of s-BPDA was added to the resulting solution, and the mixture was stirred at 70° C. for 6 hours. Still, s-BPDA was not dissolved therein homogeneously, and an aqueous polyimide precursor solution composition could not be obtained.

The results are shown in Table 3.

Comparative Example 3

In a 500 mL (internal volume) glass reaction vessel equipped with a stirrer and a nitrogen-gas charging/discharging tube was placed 400 g of water as a solvent. And then, 21.75 g (0.109 mol) of ODA and 24.63 g (0.012 mol) of JEFFAMINE D2000, and 29.01 g (1.25 equivalents per carboxyl group) of 1,2-DMZ were added thereto, and the mixture was stirred at 25° C. for 1 hour to dissolve these compounds in water. Subsequently, 53.61 g (0.121 mol) of 6FDA was added to the resulting solution, and the mixture was stirred at 70° C. for 6 hours. Still, 6FDA was not dissolved therein homogeneously, and an aqueous polyimide precursor solution composition could not be obtained.

The results are shown in Table 3.

Comparative Example 4

In a 500 mL (internal volume) glass reaction vessel equipped with a stirrer and a nitrogen-gas charging/discharging tube was placed 400 g of water as a solvent. And then, 33.30 g (0.166 mol) of ODA and 10.11 g (0.018 mol) of PRIAMINE 1074, and 44.41 g (1.25 equivalents per carboxyl group) of 1,2-DMZ were added thereto, and the mixture was stirred at 25° C. for 1 hour to dissolve these compounds in water. Subsequently, 56.59 g (0.184 mol) of c-DCDA was added to the resulting solution, and the mixture was stirred at 70° C. for 6 hours. Still, c-DCDA was not dissolved therein homogeneously, and an aqueous polyimide precursor solution composition could not be obtained.

The results are shown in Table 3.

TABLE 1-1

| | | Example 1 | Example 2 | Example 3 | Example 4 | Example 5 | Example 6 | Example 7 | Example 8 |
|---|---|---|---|---|---|---|---|---|---|
| Composition of aqueous polyimide precursor solution | | | | | | | | | |
| acid component | s-BPDA (mol %) | 100 | 100 | 100 | 30 | | | | |
| | ODPA (mol %) | | | | | 100 | | | |
| | 6FDA (mol %) | | | | | | 100 | 100 | 100 |
| | t-DCDA (mol %) | | | | | | | | |
| | c-DCDA (mol %) | | | | 70 | | | | |
| diamine component | ODA (mol %) | | | | | | 100 | | |
| | PPD (mol %) | | | | | | | 100 | |
| | t-CHDA (mol %) | 100 | | | 100 | 100 | | | 100 |
| | HMD (mol %) | | 100 | | | | | | |
| | DAB (mol %) | | | 100 | | | | | |
| | DAP (mol %) | | | | | | | | |
| imidazole | 1,2-DMZ (equivalents) | 1.25 | 1.25 | 1.25 | 1.25 | 1.25 | 1.25 | 1.25 | 1.25 |

TABLE 1-1-continued

|  | | Example 1 | Example 2 | Example 3 | Example 4 | Example 5 | Example 6 | Example 7 | Example 8 |
|---|---|---|---|---|---|---|---|---|---|
| Aqueous polyimide precursor solution | | | | | | | | | |
| | polymerization temperature | 70 | 70 | 70 | 70 | 70 | 70 | 70 | 70 |
| | polymerization time | 6 | 6 | 6 | 6 | 6 | 6 | 6 | 6 |
| | inherent viscosity | 0.72 | 0.63 | 0.45 | 0.27 | 0.43 | 0.13 | 0.62 | 0.40 |
| | solid content (wt %) | 12.8 | 12.4 | 12.2 | 12.2 | 12.5 | 13.0 | 13.4 | 12.2 |
| | solution viscosity (Pa · s) | 1.2 | 0.7 | 0.3 | 0.1 | 0.1 | 2.5 | 4.5 | 0.1 |
| Properties of polyimide | | | | | | | | | |
| | state observation | ○ | ○ | ○ | ○ | ○ | ○ | ○ | ○ |
| | light transmittance at 400 nm (%) | 75 | 78 | 80 | 92 | 84 | 78 | 62 | 88 |
| | total light transmittance (%) | 95 | 91 | 92 | 94 | 89 | 91 | 94 | 91 |

TABLE 1-2

|  | | Example 9 | Example 10 | Example 11 | Example 12 | Example 13 | Example 14 | Example 15 | Example 16 |
|---|---|---|---|---|---|---|---|---|---|
| Composition of aqueous polyimide precursor solution | | | | | | | | | |
| acid compontent | s-BPDA (mol %) | | | | | | | | |
| | ODPA (mol %) | | | | | | | | |
| | 6FDA (mol %) | | | | | | | | |
| | t-DCDA (mol %) | 100 | 100 | 100 | 100 | | | | |
| | c-DCDA (mol %) | | | | | 100 | 100 | 100 | 100 |
| diamine component | ODA (mol %) | | | | | | | | |
| | PPD (mol %) | | | | | | | | |
| | t-CHDA (mol %) | 100 | | | | 100 | | | |
| | HMD (mol %) | | 100 | | | | 100 | | |
| | DAB (mol %) | | | 100 | | | | 100 | |
| | DAP (mol %) | | | | 100 | | | | 100 |
| imidazole | 1,2-DMZ (equivalents) | 1.25 | 1.25 | 1.25 | 1.25 | 1.25 | 1.25 | 1.25 | 1.25 |
| Aqueous polyimide precursor solution | | | | | | | | | |
| | polymerization temperature | 70 | 70 | 70 | 70 | 70 | 70 | 70 | 70 |
| | polymerization time | 6 | 6 | 6 | 6 | 6 | 6 | 6 | 6 |
| | inherent viscosity | 0.20 | 0.25 | 0.25 | 0.27 | 0.18 | 0.18 | 0.19 | 0.17 |
| | solid content (wt %) | 12.4 | 12.2 | 12.3 | 12.0 | 12.2 | 12.2 | 12.3 | 12.0 |
| | solution viscosity (Pa · s) | 0.5 | 0.6 | 0.4 | 0.3 | 0.4 | 0.5 | 0.2 | 0.1 |
| Properties of polyimide | | | | | | | | | |
| | state observation | ○ | ○ | ○ | ○ | ○ | ○ | ○ | ○ |
| | light transmittance at 400 nm (%) | 84 | 88 | 90 | 89 | 84 | 85 | 87 | 88 |
| | total light transmittance (%) | 89 | 90 | 92 | 92 | 91 | 92 | 92 | 91 |

TABLE 1-3

|  | | Example 17 | Example 18 | Example 19 | Example 20 |
|---|---|---|---|---|---|
| Composition of aqueous polyimide precursor solution | | | | | | 
| acid component | s-BPDA (mol %) | 75 | 25 | 100 | 100 |
| | ODPA (mol %) | | | | |
| | 6FDA (mol %) | | 75 | | |
| | t-DCDA (mol %) | 25 | | | |
| | c-DCDA (mol %) | | | | |
| diamine component | ODA (mol %) | 25 | 75 | 20 | |
| | PPD (mol %) | | | | 20 |
| | t-CHDA (mol %) | | 25 | | |
| | HMD (mol %) | 75 | | 80 | 80 |
| | DAB (mol %) | | | | |
| | DAP (mol %) | | | | |
| imidazole | 1,2-DMZ (equivalents) | 1.25 | 1.25 | 1.25 | 1.25 |

TABLE 1-3-continued

|  | Example 17 | Example 18 | Example 19 | Example 20 |
|---|---|---|---|---|
| Aqueous polyimide precursor solution | | | | |
| polymerization temperature | 70 | 70 | 70 | 70 |
| polymerization time | 6 | 6 | 6 | 6 |
| inherent viscosity | 0.49 | 0.22 | 0.72 | 0.86 |
| solid content (wt %) | 12.1 | 13.4 | 16.0 | 15.7 |
| solution viscosity (Pa · s) | 1.2 | 4.5 | 0.7 | 1.4 |
| Properties of polyimide | | | | |
| state observation | ◯ | ◯ | ◯ | ◯ |
| light transmittance at 400 nm (%) | 75 | 75 | 75 | 70 |
| total light transmittance (%) | 88 | 93 | 92 | 93 |

TABLE 2

|  |  | Reference Example 1 | Reference Example 2 | Reference Example 3 | Reference Example 4 | Reference Example 5 | Reference Example 6 | Reference Example 7 |
|---|---|---|---|---|---|---|---|---|
| Composition of aqueous polyimide precursor solution | | | | | | | | |
| acid component | s-BPDA (mol %) | 100 | 100 | 100 | 100 | 100 | 70 | 70 |
|  | c-DCDA (mol %) | | | | | | | |
|  | t-DCDA (mol %) | | | | | | 30 | |
|  | H-PMDA (mol %) | | | | | | | 30 |
| diamine component | ODA (mol %) | 100 | | 50 | | | | |
|  | PPD (mol %) | | 100 | 50 | 60 | 70 | 100 | 100 |
|  | t-CHDA (mol %) | | | | 40 | | | |
|  | HMD (mol %) | | | | | 30 | | |
| imidazole | 1,2-DMZ (equivalents) | 1.25 | 1.25 | 1.25 | 1.25 | 1.25 | 1.25 | 1.25 |
| Aqueous polyimide precursor solution | | | | | | | | |
| polymerization temperature | | 70 | 70 | 70 | 70 | 70 | 70 | 70 |
| polymerization time | | 6 | 6 | 6 | 6 | 6 | 6 | 6 |
| inherent viscosity | | 0.42 | 1.86 | 0.54 | 1.04 | 0.82 | 0.87 | 0.60 |
| solid content (wt %) | | 8.7 | 9.1 | 8.7 | 16.7 | 16.1 | 16.2 | 16.5 |
| solution viscosity (Pa · s) | | 32.0 | 63.0 | 52.2 | 27.2 | 30.2 | 107.5 | 8.7 |
| Properties of polyimide | | | | | | | | |
| state observation | | ◯ | ◯ | ◯ | ◯ | ◯ | ◯ | ◯ |
| light transmittance at 400 nm (%) | | 6 | 5 | 5 | 22 | 31 | 12 | 15 |
| total light transmittance (%) | | 78 | 75 | 76 | 85 | 87 | 78 | 80 |

TABLE 3

|  |  | Comparative Example 1 | Comparative Example 2 | Comparative Example 3 | Comparative Example 4 |
|---|---|---|---|---|---|
| Composition of aqueous polyimide precursor solution | | | | | |
| acid component | s-BPDA (mol %) | 100 | 100 | | |
|  | 6FDA (mol %) | | | 100 | |
|  | c-DCDA (mol %) | | | | 100 |
| diamine component | ODA (mol %) | | | 90 | 90 |
|  | HMD (mol %) | 90 | 90 | | |
|  | D2000 (mol %) | 10 | | 10 | |
|  | 1074 (mol %) | | 10 | | 10 |
| imidazole | 1,2-DMZ (equivalents) | 1.25 | 1.25 | 1.25 | 1.25 |
| Aqueous polyimide precursor solution | | | | | |
| polymerization temperature | | 70 | 70 | 70 | 70 |
| polymerization time | | 6 | 6 | 6 | 6 |
| inherent viscosity | | | | | |
| solid content (wt %) | | Aqueous polyimide precursor solution could not be obtained. (not homogeneously dissolved) | | | |
| solution viscosity (Pa · s) | | | | | |

INDUSTRIAL APPLICABILITY

According to the present invention, there may be provided a method for easily producing an aqueous polyimide precursor solution composition, which has higher environmental acceptability, without the need for a solvent other than water. According to the production method, an aqueous polyimide precursor solution composition having an extremely low organic solvent content, particularly an aqueous polyimide precursor solution composition comprising an aqueous solvent which contains no organic solvent, may be very easily (directly) produced.

According to the present invention, there may be provided an aqueous polyimide precursor solution composition which comprises an aqueous solvent and has good environmental acceptability, and may provide a polyimide having high transparency, and having excellent properties such as flexibility, heat resistance, electrical properties, and solvent resistance, and preferably comprises a solvent containing no organic solvent other than water. The polyimide obtained by heating the aqueous polyimide precursor solution composition of the present invention may be suitably used for an electrical device, an electronic device, an optical device, or the like, and may be suitably used, for example, as a substrate, or a protective film for a display device such as a liquid crystal display, an EL display and an electronic paper, a touch panel, a solar battery, or an LED lighting device, or the like. The polyimide may be particularly suitably used as a substrate of a flexible device, for example, a display device such as a liquid crystal display, an organic EL display and an electronic paper, and a light-receiving device such as a light-receiving element of a thin-film solar battery.

According to the present invention, there may be also provided a polyimide precursor resin composition for flexible device substrates, which comprises an aqueous solvent and has good environmental acceptability. Moreover, the polyimide substrate for flexible device which is obtained according to the present invention may have high transparency, and have excellent properties such as flexibility, heat resistance, electrical properties, and solvent resistance, and therefore may be suitably used, for example, as a substrate for flexible device which is a display device such as substrates for a liquid crystal display, an organic EL display and an electronic paper, and as a substrate for flexible device which is a light-receiving device such as a substrate for a thin-film solar battery.

What is claimed is:

1. A method for producing an aqueous polyimide precursor solution composition, comprising:
    reacting a tetracarboxylic acid component and a diamine component in water containing no organic solvent in a presence of an imidazole to form a polyamic acid comprising a repeating unit represented by the following formula (1),
    wherein,
    the polyamic acid and the imidazole are dissolved in the water,
    an amount of the imidazole is 1.6 mole or more per mole of the tetracarboxylic acid component,
    the tetracarboxylic acid component comprises at least one selected from the group consisting of an aromatic tetracarboxylic dianhydride containing no fluorine group, an aliphatic tetracarboxylic dianhydride, and aromatic tetracarboxylic dianhydride containing a fluorine group; the aromatic tetracarboxylic dianhydride containing no fluorine group being selected from the group consisting of 3,3',4,4'-biphenyltetracarboxylic dianhydride, 2,3,3',4'-biphenyltetracarboxylic dianhydride, 2,2',3,3'-biphenyltetracarboxylic dianhydride, 4,4'-oxydiphthalic dianhydride, diphenylsulfone tetracarboxylic dianhydride, p-terphenyl tetracarboxylic dianhydride, and m-terphenyl tetracarboxylic dianhydride, and
    the diamine component comprises at least one selected from the group consisting of an aromatic diamine containing no fluorine group and having a solubility in water at 25° C. of 0.1 g/L or more, an aliphatic diamine having a molecular weight of 500 or less and selected from the group consisting of alicyclic diamine, 1,6-hexamethylene diamine and 1,10-decamethylene diamine, and an aromatic diamine containing a fluorine group, and
    wherein,
    (i) not less than 50 mol % of the tetracarboxylic dianhydride component is the aliphatic tetracarboxylic dianhydride, and/or the aromatic tetracarboxylic dianhydride containing a fluorine group, and not more than 50 mol %, including 0 mol %, of the tetracarboxylic dianhydride component is the aromatic tetracarboxylic dianhydride containing no fluorine group, or
    (ii) not less than 50 mol % of the tetracarboxylic dianhydride component is the aromatic tetracarboxylic dianhydride containing no fluorine group, and not less than 50 mol % of the diamine component is the aliphatic diamine having a molecular weight of 500 or less, and/or the aromatic diamine containing a fluorine group, and not more than 50 mol %, including 0 mol %, of the diamine component is an aromatic diamine containing no fluorine group and having a solubility in water at 25° C. of 0.1 g/L or more,

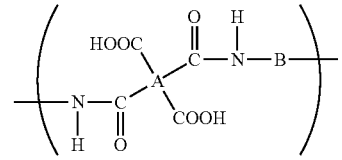

Formula (1)

wherein
    A represents a tetravalent group derived from the tetracarboxylic acid component and B represents a divalent group derived from the diamine component.

2. The method for producing an aqueous polyimide precursor solution composition according to claim 1, wherein the imidazole is selected from the group consisting of 1,2-dimethylimidazole, 2-ethyl-4-methylimidazole, 4-ethyl-2-methylimidazole, and 1-methyl-4-ethylimidazole.

3. The method for producing an aqueous polyimide precursor solution composition according to claim 1, wherein the polyamic acid has an inherent viscosity of 0.4 or more.

4. A method for producing a polyimide comprising producing the aqueous polyimide precursor solution composition according to the method of claim 1; and
    heating the aqueous polyimide precursor solution composition.

5. The method for producing a polyimide as claimed in claim 4, wherein the polyimide has a light transmittance at 400 nm of 60% or more when the polyimide is formed into a film having a thickness of 10 μm.

6. The method for producing a polyimide as claimed in claim 4, wherein the polyimide has a total light transmittance of 80% or more when the polyimide is formed into a film having a thickness of 10 μm.

7. A method for producing a flexible device which is a display device or a light-receiving device, comprising: producing the aqueous polyimide precursor solution composition according to the method of claim 1; and
applying the aqueous polyimide precursor solution composition onto a carrier substrate, and then heating the composition to form a solid polyimide resin film;
forming a circuit on the polyimide resin film; and
separating the polyimide resin film on which the circuit is formed from the carrier substrate.

8. A method for producing an aqueous polyimide precursor solution composition, comprising:
reacting a tetracarboxylic acid component and a diamine component in water containing no organic solvent in a presence of an imidazole at 50° C. or higher and 100° C. or lower to form a polyamic acid comprising a repeating unit represented by the following formula (1), wherein,
the polyamic acid and the imidazole are dissolved in the water,
an amount of the imidazole is 1.6 mole or more per mole of the tetracarboxylic acid component,
the tetracarboxylic acid component comprises at least one selected from the group consisting of an aromatic tetracarboxylic dianhydride containing no fluorine group, an aliphatic tetracarboxylic dianhydride, and aromatic tetracarboxylic dianhydride containing a fluorine group, and
the diamine component comprises at least one selected from the group consisting of an aromatic diamine containing no fluorine group and having a solubility in water at 25° C. of 0.1 g/L or more, an aliphatic diamine having a molecular weight of 500 or less and selected from the group consisting of alicyclic diamine, 1,6-hexamethylene diamine and 1,10-decamethylene diamine, and an aromatic diamine containing a fluorine group, and wherein, not less than 50 mol % of the tetracarboxylic dianhydride component is the aliphatic tetracarboxylic dianhydride, and/or the aromatic tetracarboxylic dianhydride containing a fluorine group, and not more than 50 mol %, including 0 mol %, of the tetracarboxylic dianhydride component is the aromatic tetracarboxylic dianhydride containing no fluorine group, and/or not less than 50 mol % of the diamine component is the aliphatic diamine having a molecular weight of 500 or less, and/or the aromatic diamine containing a fluorine group, and not more than 50 mol %, including 0 mol %, of the diamine component is an aromatic diamine containing no fluorine group and having a solubility in water at 25° C. of 0.1 g/L or more,

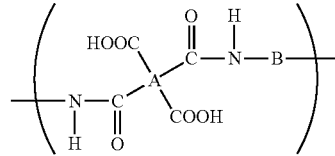

Formula (1)

wherein
A represents a tetravalent group derived from the tetracarboxylic acid component and B represents a divalent group derived from the diamine component.

* * * * *